(12) United States Patent
LaFleur

(10) Patent No.: US 10,216,707 B2
(45) Date of Patent: Feb. 26, 2019

(54) METHODS AND SYSTEMS FOR CALCULATING UNCERTAINTY

(71) Applicant: Clarkson University, Potsdam, NY (US)

(72) Inventor: Ronald S. LaFleur, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 15/694,427

(22) Filed: Sep. 1, 2017

(65) Prior Publication Data

US 2018/0011816 A1    Jan. 11, 2018

Related U.S. Application Data

(63) Continuation-in-part of application No. 14/539,089, filed on Nov. 12, 2014, now abandoned.

(60) Provisional application No. 62/383,056, filed on Sep. 2, 2016.

(51) Int. Cl.
  *G06F 17/18* (2006.01)
  *G06F 9/44* (2018.01)
  *G06F 8/30* (2018.01)
  *G06F 17/10* (2006.01)

(52) U.S. Cl.
  CPC ............... *G06F 17/18* (2013.01); *G06F 8/30* (2013.01); *G06F 17/10* (2013.01)

(58) Field of Classification Search
  CPC ...... G06F 17/18; G06F 17/10; G06F 19/3431; G05B 17/02; G01V 99/005
  See application file for complete search history.

(56) References Cited

U.S. PATENT DOCUMENTS

| | | | |
|---|---|---|---|
| 7,130,761 B2 | 10/2006 | Hall et al. | |
| 7,996,155 B2 | 8/2011 | Weng | |
| 2004/0260526 A1* | 12/2004 | Hall | G06F 17/18 703/12 |
| 2005/0004833 A1* | 1/2005 | McRae | G05B 17/02 703/2 |
| 2006/0217925 A1* | 9/2006 | Taron | G06F 17/10 702/179 |
| 2010/0325031 A1* | 12/2010 | Kahan | G06Q 40/04 705/37 |

(Continued)

OTHER PUBLICATIONS

LaFleur, Ronald S. and Goshko, Laura S., The Uncertainty of Cardiovascular Disease Risk Calculation—What is the Best Risk Model for the Individual?, Journal of Engineering and Science in Medical Diagnostics and Therapy, May 2018, 11 pages, vol. 1, Transactions of the ASME.

*Primary Examiner* — Changhyun Yi
(74) *Attorney, Agent, or Firm* — Woods Oviatt Gilman LLP; Dennis B. Danella, Esq.

(57) ABSTRACT

Disclosed are methods and systems for performing uncertainty calculations. For example, a numeric value and an error range associated with the numeric value are converted by a processor into a trans-imaginary input dual which is a hybrid of numeric and geometric information having real and complex numbers. A dual calculation is performed using the trans-imaginary input dual to produce a trans-imaginary output dual, and the processor then converts the trans-imaginary output dual to a real number output numeric value that includes both a real number and real number error range or uncertainty associated with that real number.

21 Claims, 28 Drawing Sheets

(56) References Cited

U.S. PATENT DOCUMENTS

| | | | | |
|---|---|---|---|---|
| 2011/0225037 A1* | 9/2011 | Tunca | ................... | G06Q 30/02 705/14.46 |
| 2015/0316684 A1* | 11/2015 | Schirmer | ............. | G01V 99/005 703/2 |
| 2015/0347698 A1* | 12/2015 | Soni | ................... | G06F 19/3431 706/11 |

* cited by examiner

X eX $$m_i = m_1 + (i-1)\Delta m$$
$$\text{Class Index } i = 1, 2, 3, \ldots$$
$$\text{Increment Index } (i-1) = 0, 1, 2, \ldots$$

Segment 1    $-\infty \leq \mu < m_1$
Segment 2    $m_1 \leq \mu < m_2$
Segment 3    $m_2 \leq \mu < m_3$
Segment 4    $m_3 \leq \mu < m_4$
Segment 5    $m_4 \leq \mu < m_5$
Segment 6    $m_5 \leq \mu < +\infty$ Interval 1 $\quad -\infty \leq \mu < m_1 + \frac{1}{2}\Delta m$ Interval 2 $\quad m_2 - \frac{1}{2}\Delta m \leq \mu < m_2 + \frac{1}{2}\Delta m$ Interval 3 $\quad m_3 - \frac{1}{2}\Delta m \leq \mu < m_3 + \frac{1}{2}\Delta m$ Interval 4 $\quad m_4 - \frac{1}{2}\Delta m \leq \mu < m_4 + \frac{1}{2}\Delta m$ Interval 5 $\quad m_5 - \frac{1}{2}\Delta m \leq \mu < +\infty$

FIG. 14

Physical $\quad e\mu_j \equiv \mu - m_j$

Measurement $\quad em_j \equiv m_j - \mu$

FIG. 15

$$\text{Error } 1 \quad +\infty \geq em_1 > -\frac{1}{2}\Delta m$$

$$\text{Error } 2 \quad +\frac{1}{2}\Delta m \geq em_2 > -\frac{1}{2}\Delta m$$

$$\text{Error } 3 \quad +\frac{1}{2}\Delta m \geq em_3 > -\frac{1}{2}\Delta m$$

$$\text{Error } 4 \quad +\frac{1}{2}\Delta m \geq em_4 > -\frac{1}{2}\Delta m$$

$$\text{Error } 5 \quad +\frac{1}{2}\Delta m \geq em_5 > -\infty$$

$$\tilde{m} \equiv m[p] \oplus em[v]$$

0.6   2.1   2.7
● ⊕ ● = ●

Object Dual   Subject Dual   Resultant Dual
= point       = point        = point

FIG. 22

←—1.27—→  ⊕  ↕ 1.4  =  [square with arrows, 1.89 diagonal]

Object Dual      Subject Dual      Resultant Dual
= error vector   = error vector    = error vector

FIG. 23

$$\tilde{o} \quad \oplus \quad \tilde{S} \quad = \quad \tilde{R}$$

*Identity* $\quad [o[p] \oplus \omega[v]] \oplus [I[p] \oplus \omega I[v]] = o[p] \oplus +\omega[v]$

*Conjugator* $\quad [o[p] \oplus \omega[v]] \oplus [C[p] \oplus \omega C[v]] = o[p] \oplus -\omega[v]$

*Flipper* $\quad [o[p] \oplus \omega[v]] \oplus [F[p] \oplus \omega F[v]] = \omega[p] \oplus o[v]$

*Exactor* $\quad [o[p] \oplus \omega[v]] \oplus [E[p] \oplus \omega E[v]] = o[p] \oplus 0[v]$

*Vectorize* $\quad [o[p] \oplus \omega[v]] \oplus [V[p] \oplus \omega V[v]] = 0[p] \oplus \omega[v]$

*Nullify* $\quad [o[p] \oplus \omega[v]] \oplus [N[p] \oplus \omega N[v]] = 0[p] \oplus 0[v]$

*Inverse* $\quad [o[p] \oplus \omega[v]] \oplus [O[p] \oplus \omega O[v]] = I[p] \oplus \omega I[v]$

FIG. 30

*Object* $\quad \tilde{o} = o[p] \oplus \omega[v]$

*Identity* $\quad \tilde{I} = \mathbf{0}[p] \oplus \mathbf{0}[v]$

*Conjugator* $\quad \tilde{C} = \mathbf{0}[p] \oplus -\mathbf{2}\omega[v]$

*Flipper* $\quad \tilde{F} = (\omega - o)[+\mathbf{1}[p] \oplus -\mathbf{1}[v]]$

*Exactor* $\quad \tilde{E} = \mathbf{0}[p] \oplus -\omega[v]$

*Vectorize* $\quad \tilde{V} = -o[p] \oplus \mathbf{0}[v]$

*Nullify* $\quad \tilde{N} = -o[p] \oplus -\omega[v]$

*Inverse* $\quad \tilde{O} = -o[p] \oplus -\omega[v]$

FIG. 31

$$\tilde{O} \quad \circledast \quad \tilde{S} \quad = \quad \tilde{P}$$

*Identity*     $[o[p] \oplus \omega o[v]] \circledast [I[p] \oplus \omega I[v]] = o[p] \oplus +\omega o[v]$

*Conjugator*  $[o[p] \oplus \omega o[v]] \circledast [C[p] \oplus \omega C[v]] = o[p] \oplus -\omega o[v]$

*Flipper*      $[o[p] \oplus \omega o[v]] \circledast [F[p] \oplus \omega F[v]] = \omega o[p] \oplus o[v]$

*Exactor*     $[o[p] \oplus \omega o[v]] \circledast [E[p] \oplus \omega E[v]] = o[p] \oplus 0[v]$

*Vectorize*   $[o[p] \oplus \omega o[v]] \circledast [V[p] \oplus \omega V[v]] = 0[p] \oplus \omega o[v]$

*Nullify*     $[o[p] \oplus \omega o[v]] \circledast [N[p] \oplus \omega N[v]] = 0[p] \oplus 0[v]$

*Inverse*     $[o[p] \oplus \omega o[v]] \circledast [O[p] \oplus \omega O[v]] = I[p] \oplus \omega I[v]$

FIG. 32

*Object*      $\tilde{O} = o[p] \oplus \omega o[v]$

*Identity*    $\tilde{I} = \frac{1}{D}\left[(o^2 - \sigma_V \omega^2)[p] \oplus (+\sigma_p - 1)o \times \omega o[v]\right]$

*Conjugator* $\tilde{C} = \frac{1}{D}\left[(o^2 + \sigma_V \omega^2)[p] \oplus (-\sigma_p - 1)o \times \omega o[v]\right]$

*Flipper*    $\tilde{F} = \frac{1}{D}\left[(1 - \sigma_V)o \times \omega o[p] \oplus (\sigma_p o^2 - \omega^2)[v]\right]$

*Exactor*    $\tilde{E} = \frac{o}{D}\left[o[p] \oplus -\omega o[v]\right]$

*Vectorize*  $\tilde{V} = \frac{\omega o}{D}\left[-\sigma_V \omega[p] \oplus \sigma_p o[v]\right]$

*Nullify*    $\tilde{N} = 0[p] \oplus 0[v]$

*Inverse*    $\tilde{I} = \frac{1}{D^2}\left[o \times (o^2 - \sigma_p \sigma_V \omega^2)[p] \oplus \omega o \times ((\sigma_p^2 - \sigma_p - 1)o^2 + \sigma_V \omega^2)[v]\right]$

FIG. 33

$$\tilde{R} \equiv R[p] \oplus eR[v_R]$$

FIG. 34

$$\tilde{R} \equiv \bigoplus_{n=1}^{N} \tilde{r}_n$$
$$= \tilde{r}_1 \oplus \tilde{r}_2 \oplus \tilde{r}_3 \oplus \ldots \tilde{r}_N$$
$$\equiv R[p] \oplus eR[v_R]$$

$$R = \sum_{n=1}^{N} r_i$$
$$= r_1 + r_2 + r_3 + \ldots r_N$$

$$eR[v_R] = \bigoplus_{n=1}^{N} er_i[v_i]$$
$$= er_1[v_1] \oplus er_2[v_2] \oplus er_3[v_3] \oplus \ldots er_N[v_N]$$

FIG. 35

$$\tilde{O} \equiv O[p] \oplus \bigoplus_{n=1}^{N} {_e}O_n[v_n]$$

$$\tilde{S} \equiv S[p] \oplus \bigoplus_{n=1}^{N} {_e}S_n[v_n]$$

FIG. 36

$$\tilde{P} \equiv \tilde{O} \otimes \tilde{S} = P[p] \oplus \bigoplus_{k=1}^{N} {_e}P_k[v_k]$$

$$\text{with} \quad P = \sigma_0(O \times S) + \sum_{i=1}^{N} \sigma_i({_e}O_i \times {_e}S_i)$$

$$\text{and} \quad {_e}P_k = ({_e}O_k \times S) + (O \times {_e}S_k)$$

FIG. 37

$$(_eO_k \times S) + (O \times {_eS_k}) = 0_k$$
$$\text{Co-Scalar} \quad \phi \equiv (S \div o)$$
$$\text{then} \quad {_eS_k} = -(\phi \times {_eO_k}) \quad \text{and} \quad S = (\phi \times O)$$

FIG. 38

$$\tilde{O} = O[p] \oplus \bigoplus_{j=1}^{N} (+{_eO_j})[v_j]$$

$$\tilde{S} = \phi \left( O[p] \oplus \bigoplus_{j=1}^{N} (-{_eO_j})[v_j] \right)$$

$$\tilde{P} = \phi \left( \sigma_0 O^2 - \sum_{k=1}^{N} \sigma_k {_eO_k^2} \right)[p]$$

FIG. 39

$$\tilde{O} = \bigoplus_{j=1}^{N} {_e}O_j[v_j]$$

$$\tilde{S} = (-\phi) \bigoplus_{j=1}^{N} {_e}O_j[v_j]$$

$$\tilde{P} = (-\phi) \left( \sum_{k=1}^{N} \sigma_k \, {_e}O_k^2 \right) [p]$$

FIG. 40

$$\tilde{O} = {_e}R[v_R]$$

$$\tilde{S} = (-\phi) \, {_e}R[v_R]$$

$$\tilde{P} = (-\phi) \, \sigma_R \, {_e}R^2 [p]$$

FIG. 41

$$\sigma_R eR^2 = \sum_{k=1}^{N} \sigma_k eO_k^2$$

FIG. 42

$$\tilde{S}_J = 0\,[p] \oplus \sigma_J[v_J]$$

FIG. 43

$$\begin{aligned}
\text{\textit{Object}} \quad & \tilde{o} = o\,[p] \oplus eo\,[v] \\
\text{\textit{Identity}} \quad & \tilde{I} = \frac{1}{D}\Big[\,(o^2 + \sigma_p eo^2)[p] \oplus o \times eo(+\sigma_p - 1)[v]\,\Big] \\
\text{\textit{Conjugator}} \quad & \tilde{C} = \frac{1}{D}\Big[\,(o^2 - \sigma_p eo^2)[p] \oplus o \times eo(-\sigma_p - 1)[v]\,\Big] \\
\text{\textit{Flipper}} \quad & \tilde{F} = \frac{1}{D}\Big[\,o \times eo(\sigma_p + 1)[p] \oplus (\sigma_p o^2 - eo^2)[v]\,\Big] \\
\text{\textit{Exactor}} \quad & \tilde{E} = \frac{o}{D}\Big[\,o\,[p] \oplus -eo\,[v]\,\Big] \\
\text{\textit{Vectorize}} \quad & \tilde{V} = \sigma_p \frac{eo}{D}\Big[\,eo\,[p] \oplus o\,[v]\,\Big] \\
\text{\textit{Inverse}} \quad & \tilde{I} = \frac{1}{D}\Big(\,\sigma_p o\,[p] \oplus -eo\,[v]\,\Big)
\end{aligned}$$

FIG. 44

$$\text{Identity} \quad \tilde{I} = \frac{o_p}{d}\left[\,(o^2 + \sigma_p \omega^2)[p] \oplus o \times \omega(+\sigma_p - 1)[v]\,\right]$$

$$\text{Conjugator} \quad \tilde{C} = \frac{o_p}{d}\left[\,(o^2 - \sigma_p \omega^2)[p] \oplus o \times \omega(-\sigma_p - 1)[v]\,\right]$$

$$\text{Flipper} \quad \tilde{F} = \frac{1}{d}\left[\,o \times \omega(1 + \sigma_p)[p] \oplus (o^2 - \sigma_p \omega^2)[v]\,\right]$$

$$\text{Exactor} \quad \tilde{E} = \sigma_p \frac{o}{d}\left[\,o[p] \oplus -\omega[v]\,\right]$$

$$\text{Vectorize} \quad \tilde{V} = \frac{\omega o}{d}\left[\,\omega[p] \oplus o[v]\,\right]$$

$$\text{Inverse} \quad \tilde{I} = \frac{1}{d}\left(\,o[p] \oplus -\sigma_p \omega[v]\,\right)$$

FIG. 45

$\tilde{x}^0 = 1[p] \oplus 0[v]$ $\tilde{x}^1 = \tilde{x}^0 \oplus (x[p] \oplus \alpha x[v])$
$\phantom{\tilde{x}^1} = x[p] \oplus \alpha x[v]$ $\tilde{x}^2 = \tilde{x}^1 \oplus (x[p] \oplus \alpha x[v])$
$\phantom{\tilde{x}^2} = x^2[p \oplus p] \oplus \alpha x \cdot x[v \oplus p] \oplus x \alpha x[p \oplus v] \oplus \alpha x^2[v \oplus v]$
$\phantom{\tilde{x}^2} = (x^2 + \sigma \alpha x^2)[p] \oplus (2 x \alpha x)[v]$ $\tilde{x}^3 = \tilde{x}^2 \oplus (x[p] \oplus \alpha x[v])$
$\phantom{\tilde{x}^3} = \left((x^2 + \sigma \alpha x^2)[p] \oplus (2 x \alpha x)[v]\right) \oplus (x[p] \oplus \alpha x[v])$
$\phantom{\tilde{x}^3} = (x^3 + \sigma \alpha x^2 x)[p \oplus p] \oplus (2 x^2 \alpha x)[v \oplus p] \oplus (x^2 \alpha x + \sigma \alpha x^3)[p \oplus v] \oplus (2 x \alpha x^2)[v \oplus v]$
$\phantom{\tilde{x}^3} = (x^3 + \sigma \alpha x^2 x + 2 \sigma x \alpha x^2)[p] \oplus (2 x^2 \alpha x + x^2 \alpha x + \sigma \alpha x^3)[v]$
$\phantom{\tilde{x}^3} = (x^3 + 3 \sigma x \alpha x^2)[p] \oplus (3 x^2 \alpha x + \sigma \alpha x^3)[v]$ $\tilde{x}^4 = \tilde{x}^3 \oplus (x[p] \oplus \alpha x[v])$
$\phantom{\tilde{x}^4} = \left((x^3 + 3 \sigma x \alpha x^2)[p] \oplus (3 x^2 \alpha x + \sigma \alpha x^3)[v]\right) \oplus (x[p] \oplus \alpha x[v])$
$\phantom{\tilde{x}^4} = (x^4 + 3 \sigma x^2 \alpha x^2)[p \oplus p] \oplus (3 x^3 \alpha x + \sigma x \alpha x^3)[v \oplus p]$
$\phantom{\tilde{x}^4 =} \oplus (x^3 \alpha x + 3 \sigma x \alpha x^3)[p \oplus v] \oplus (3 x^2 \alpha x^2 + \sigma \alpha x^4)[v \oplus v]$
$\phantom{\tilde{x}^4} = (x^4 + 6 \sigma x^2 \alpha x^2 + \sigma^2 \alpha x^4)[p] \oplus (4 x^3 \alpha x + 4 \sigma x \alpha x^3)[v]$

FIG. 46

$$\begin{aligned}
\tilde{x}^5 &= \tilde{x}^4 \otimes (x[p] \otimes \alpha[v]) \\
&= ((x^4 + 6\sigma x^2 \alpha^2 + \sigma^2 \alpha^4)[p] \otimes (4x^3 \alpha + 4\sigma x \alpha^3)[v]) \otimes (x[p] \otimes \alpha[v]) \\
&= (x^5 + 6\sigma x^3 \alpha^2 + \sigma^2 x \alpha^4)[p \otimes p] \otimes (4x^4 \alpha + 4\sigma x^2 \alpha^3)[v \otimes p] \\
&\quad \otimes (x^4 \alpha + 6\sigma x^2 \alpha^3 + \sigma^2 \alpha^5)[p \otimes v] \otimes (4x^3 \alpha^2 + 4\sigma x \alpha^4)[v \otimes v] \\
&= (x^5 + 10\sigma x^3 \alpha^2 + 5\sigma^2 x \alpha^4)[p] \otimes (5x^4 \alpha + 10\sigma x^2 \alpha^3 + \sigma^2 \alpha^5)[v]
\end{aligned}$$

$$\begin{aligned}
\tilde{x}^6 &= \tilde{x}^5 \otimes (x[p] \otimes \alpha[v]) \\
&= ((x^5 + 10\sigma x^3 \alpha^2 + 5\sigma^2 x \alpha^4)[p] \otimes (5x^4 \alpha + 10\sigma x^2 \alpha^3 + \sigma^2 \alpha^5)[v]) \\
&\quad \otimes (x[p] \otimes \alpha[v]) \\
&= (x^6 + 10\sigma x^4 \alpha^2 + 5\sigma^2 x^2 \alpha^4)[p \otimes p] \\
&\quad \otimes (5x^5 \alpha + 10\sigma x^3 \alpha^3 + \sigma^2 x \alpha^5)[v \otimes p] \\
&\quad \otimes (x^5 \alpha + 10\sigma x^3 \alpha^3 + 5\sigma^2 x \alpha^5)[p \otimes v] \\
&\quad \otimes (5x^4 \alpha^2 + 10\sigma x^2 \alpha^4 + \sigma^2 \alpha^6)[v \otimes v] \\
&= (x^6 + 15\sigma x^4 \alpha^2 + 15\sigma^2 x^2 \alpha^4 + \sigma^3 \alpha^6)[p] \\
&\quad \otimes (6x^5 \alpha + 20\sigma x^3 \alpha^3 + 6\sigma^2 x \alpha^5)[v]
\end{aligned}$$

$$\begin{aligned}
\tilde{x}^7 &= \tilde{x}^6 \otimes (x[p] \otimes \alpha[v]) \\
&= ((x^6 + 15\sigma x^4 \alpha^2 + 15\sigma^2 x^2 \alpha^4 + \sigma^3 \alpha^6)[p] \\
&\quad \otimes (6x^5 \alpha + 20\sigma x^3 \alpha^3 + 6\sigma^2 x \alpha^5)[v]) \otimes (x[p] \otimes \alpha[v]) \\
&= (x^7 + 15\sigma x^5 \alpha^2 + 15\sigma^2 x^3 \alpha^4 + \sigma^3 x \alpha^6)[p \otimes p] \\
&\quad \otimes (6x^6 \alpha + 20\sigma x^4 \alpha^3 + 6\sigma^2 x^2 \alpha^5)[v \otimes p] \\
&\quad \otimes (x^6 \alpha + 15\sigma x^4 \alpha^3 + 15\sigma^2 x^2 \alpha^5 + \sigma^3 \alpha^7)[p \otimes v] \\
&\quad \otimes (6x^5 \alpha^2 + 20\sigma x^3 \alpha^4 + 6\sigma^2 x \alpha^6)[v \otimes v] \\
&= (x^7 + 21\sigma x^5 \alpha^2 + 35\sigma^2 x^3 \alpha^4 + 7\sigma^3 x \alpha^6)[p] \\
&\quad \otimes (7x^6 \alpha + 35\sigma x^4 \alpha^3 + 21\sigma^2 x^2 \alpha^5 + \sigma^3 \alpha^7)[v]
\end{aligned}$$

$$\begin{aligned}
\tilde{x}^8 &= \tilde{x}^7 \otimes (x[p] \otimes \alpha[v]) \\
&= ((x^7 + 21\sigma x^5 \alpha^2 + 35\sigma^2 x^3 \alpha^4 + 7\sigma^3 x \alpha^6)[p] \\
&\quad \otimes (7x^6 \alpha + 35\sigma x^4 \alpha^3 + 21\sigma^2 x^2 \alpha^5 + \sigma^3 \alpha^7)[v]) \otimes (x[p] \otimes \alpha[v]) \\
&= (x^8 + 21\sigma x^6 \alpha^2 + 35\sigma^2 x^4 \alpha^4 + 7\sigma^3 x^2 \alpha^6)[p \otimes p] \\
&\quad \otimes (7x^7 \alpha + 35\sigma x^5 \alpha^3 + 21\sigma^2 x^3 \alpha^5 + \sigma^3 x \alpha^7)[v \otimes p] \\
&\quad \otimes (x^7 \alpha + 21\sigma x^5 \alpha^3 + 35\sigma^2 x^3 \alpha^5 + 7\sigma^3 x \alpha^7)[p \otimes v] \\
&\quad \otimes (7x^6 \alpha^2 + 35\sigma x^4 \alpha^4 + 21\sigma^2 x^2 \alpha^6 + \sigma^3 \alpha^8)[v \otimes v] \\
&= (x^8 + 28\sigma x^6 \alpha^2 + 70\sigma^2 x^4 \alpha^4 + 28\sigma^3 x^2 \alpha^6 + \sigma^4 \alpha^8)[p] \\
&\quad \otimes (8x^7 \alpha + 56\sigma x^5 \alpha^3 + 56\sigma^2 x^3 \alpha^5 + 8\sigma^3 x \alpha^7)[v]
\end{aligned}$$

FIG. 47

```
% check calculation of functions of duals
clc
% f=sin(x);
sigma=-1;
sigmah=sqrt(sigma);
x=2;
ex=0.5;
%
xU=x+sigmah*ex
xL=x-sigmah*ex
%
%fU=sin(xU)*cos(xU)*exp(xU)*(xU^2)+xU^6
%fL=sin(xL)*cos(xL)*exp(xL)*(xL^2)+xL^6
fU=3.2*log(xU)
fL=3.2*log(xL)
%
f=(fU+fL)/2,    % this is real
ef=(fU-fL)/2;   % this is purely imaginary for sigma=-1;
ef=ef/sigmah,   % this is real
%
%
%
%
```

FIG. 49

```
function [f,ef]=NaturalLogarithmOfDual(x,ex,sigma)
%
if nargin<3, sigma=1; end; %sigma=-1;
sigmah=sqrt(sigma);
%
if nargin<1, x=1; end;
if nargin<2, ex=0.5; end;
%
xU=x+sigmah.*ex;
xL=x-sigmah.*ex;
%
fU=log(xU);
fL=log(xL);
%
f=(fU+fL)./2;   % t
ef=(fU-fL)./2;  % tl                sigma=-1;
ef=ef./sigmah;  % this is real
%
%
%
%
```
— 600

FIG. 50

METHODS AND SYSTEMS FOR CALCULATING UNCERTAINTY

CROSS-REFERENCE TO RELATED APPLICATIONS

This application is a continuation-in-part of pending U.S. patent application Ser. No. 14/539,089, filed Nov. 12, 2014, entitled METHODS AND SYSTEMS FOR CALCULATING UNCERTAINTY, the entirety of which is incorporated herein by reference. This application also claims the benefit of U.S. Provisional Patent Application No. 62/383,056, filed Sep. 2, 2016, entitled TRANS-IMAGINARY CHORDALS IMPLEMENTATION OF THE DUALS METHOD FOR CALCULATING UNCERTAINTY, the entirety of which is incorporated herein by reference.

BACKGROUND

The present invention relates to methods and systems for determining uncertainty. More specifically, the present invention relates to methods and systems for calculating uncertainty using chordal or dual data.

Measurements and calculations inherently include uncertainty, whether obtained by a human or a machine. Even the most accurate machines, designed to take the most detailed measurements, provide a margin of error when reporting a measurement. Further, calculations performed using similar equations that should theoretically result in the same answer can sometimes provide different answers, thus resulting in a "dependency problem."

A dependency problem can occur, for example, when performing uncertainty calculations using two or more formula that are similar but produce different results. For example, a formula can be structured as $x*(y-z)$ in a first form and as $(x*y)-(x*z)$ in a second form. While the two formulae should result in the same answer when X, Y, and Z are provided, they may not always provide identical answers, demonstrating that errors can affect all calculations. From a practical standpoint, this implies that one may not in face be free to structure formula or calculations in just any form, even if those formula or calculations should theoretically always arrive at the same answer. Accordingly, there is a continued need for methods to resolve or ameliorate the dependency problem by calculating uncertainty.

In view of the above, Applicant has previously filed a U.S. patent application directed to the use of chordals and duals to provide a new way to effectively and accurately assess error, propagate error and provide uncertainty reporting, see U.S. Publication No. 2016/0132462 (the '462 Application), the entirety of which is incorporated by reference. As discussed in the '462 Application, the duals method has been demonstrated to provide a robust method for performing both small and large-scale computations. It has been shown that the duals method's computational steps are immune to the fatal problems of divide-by-zero and square-root-of-negative seen with traditional computational arithmetic. The duals method also eliminates the dependency problem of uncertainty calculations.

However, current efforts to implement duals arithmetic in commercial computer languages (such as, for example, Excel, MATLAB, Python, mathjs, or LabVIEW) and wide practical applications (such as medical, finance, sports, engineering and science) is hampered by a lack of knowledge of the theory of duals arithmetic and the effective steps needed to create efficient software code. The duals method implementation requires a simpler way to convert all numbers, arithmetic steps and functions to the duals arithmetic format. Thus, there is a need for effective duals method implementation by utilizing built-in mathematical functions common to many software languages.

This present invention satisfies these and other needs through the use of 'trans-imaginary' numbers and a computational technique that activates the role of the chordals method in support of duals method implementation.

BRIEF SUMMARY

According to an aspect is a system for uncertainty calculation, the system including (i) a user interface module adapted to receive a numeric value and an error value associated with said numeric value; (ii) a processor, the processor adapted to receive the numeric value and the error value from the user interface module. The processor further includes: (i) a conversion module adapted to convert the numeric value and the error value into a trans-imaginary input dual, wherein said trans-imaginary input dual is a hybrid of numeric and geometric information having real and complex numbers; (ii) a calculation module adapted to perform a dual calculation using said trans-imaginary input dual, wherein a trans-imaginary output dual is generated; and (iii) a rendering module adapted to determine scalars of said trans-imaginary output dual and generate a real number output numeric value, the real number output numeric value comprising both a real number and a real number error range associated with said real number.

According to an embodiment, the numeric value is a measurement, and the error value is an error range or uncertainty associated with the measurement.

According to an embodiment, the system further includes a non-transitory storage medium configured to store the numeric value, the error value, and/or the trans-imaginary input dual.

According to an embodiment, the user interface module is further configured to output the real number output numeric value. According to an embodiment, the user interface module is a biosensor.

According to an embodiment, the system further includes a communications module adapted to receive the first numeric value.

According to an embodiment, the system further comprises a formatting module adapted to format said trans-imaginary input dual, wherein the format is dependent at least in part upon a calculation to be performed using the formatted trans-imaginary input dual.

According to an embodiment, the processor further comprises software code configured to convert the numeric value and the error value into the trans-imaginary input dual, perform the dual calculation, and generate the real number output numeric value.

According to an embodiment, the software code is a pre-existing software code adapted to perform the dual calculation.

According to an embodiment, the software code is a new software code generated to perform the dual calculation.

According to an aspect is a computerized method for uncertainty calculation. The method includes the steps of: (i) receiving, via a user interface module, a numeric value and an error range associated with said numeric value; (ii) receiving, at a processor, the numeric value and the error range from said user interface module; (iii) converting, using the processor, the numeric value and the error value into a trans-imaginary input dual, wherein said trans-imaginary input dual is a hybrid of numeric and geometric information having real and complex numbers; (iv) performing, using the processor, a dual calculation using said trans-imaginary input dual, wherein a trans-imaginary output dual is generated; and (v) determining, using the processor, a scalar of said trans-imaginary output dual and generating a real number output numeric value, the real number output numeric value comprising both a real number and a real number error range associated with said real number. The method may comprise a computer-implemented method programmed for execution in a computing environment.

According to an embodiment, the first numeric value is a measurement, and the error value is an error range or uncertainty associated with the measurement.

According to an embodiment, the method further includes the step of taking the measurement.

According to an embodiment, the method further includes the step of storing the numeric value, the error value, and/or the trans-imaginary input dual in a non-transitory storage medium.

According to an embodiment, the method further includes the step of outputting, using the user interface device, the real number output numeric value. According to an embodiment, the user interface device is a bioactuator.

According to an embodiment, the method further includes the step of communicating the real number output numeric value via a wired or wireless network.

According to an embodiment, the method further comprises the step of formatting, using the processor, said trans-imaginary input dual, wherein said format is dependent at least in part upon a calculation to be performed using said formatted trans-imaginary input dual.

According to an embodiment, the method further comprises the step of populating the processor with a software code configured to convert the numeric value and the error value into the trans-imaginary input dual, perform the dual calculation, and generate the real number output numeric value.

According to an embodiment, the software code is a pre-existing software code adapted to perform the dual calculation.

According to an embodiment, the software code is a new software code generated to perform the dual calculation.

BRIEF DESCRIPTION OF THE DRAWING

The present invention will be more fully understood and appreciated by reading the following Detailed Description in conjunction with the accompanying drawings, in which:

FIG. 14 is an example of intervals in accordance with an embodiment;

FIG. 15 depicts error definitions in accordance with an embodiment;

FIG. 22 is a diagram of addition of points, in accordance with an embodiment;

FIG. 23 is a diagram of error vector addition, in accordance with an embodiment;

FIGS. 30-47 are special operations in accordance with various embodiments of the invention;

FIG. 49 is an exemplary software code adapted for use within a computerized method for uncertainty calculation in accordance with an embodiment; and FIG. 50 is another exemplary software code adapted for use within a computerized method for uncertainty calculation in accordance with an embodiment.

DETAILED DESCRIPTION

Figures 1, 2:
FIG. 1 is horizontal dual number format in accordance with an embodiment.
FIG. 2 is a dual number format in accordance with an embodiment.

Calculation of simultaneous uncertainty using chordals and duals impacts a wide range of applications in society, including but not limited to the fields of engineering, medicine, science, and business. Applications are distinguished by the types of calculation and number representations required. Those skilled in the art recognize that the methods and systems disclosed and envisioned herein encompass any use of numbers, geometry, and their calculation, and example applications and sets of applications listed are for illustration of this.

A first application involves, for example, repetitive calculations affected by round-off. For example, non-linear calculations such as computational fluid dynamics of drug delivery, complex control systems such as those used in nuclear reactions, the world banking structure and monetary exchange at any scale.

A second set of applications involve, for example, forecasting events or life expectancy such as the prediction of turbine blade failure for scheduling maintenance events, weather prediction, earthquake prediction, insurance policy and cardio-vascular risk calculators.

A third set of applications rely on knowledge of critical or transition points such as flow valve control in manufacturing, switching in power generation systems and the numerous buy-sell orders used in market trading.

A fourth set of applications deal with information quality and this is important in pharmaceuticals with a narrow therapeutic index, polling a population or election results, electronic/photonic communications in the presence of noise, gamification and virtual reality applications.

A fifth set of applications are in resource and commodity management such as supply chains, fuels such as oil, gasoline, jet fuel and natural gas, and delivery systems such as water, electrical grid, communication grid, military logistics and satellite deployment.

A sixth set of applications is fundamental, appearing in many places where routine calculations must be performed in the background benefit directly from the use of chordal and dual arithmetic. For example dynamic sample statistics, instrument calibrations, use of the Pythagorean theorem and the problems of dependency, divide-by-zero and square-root-of-negative. These operations are used by all computers, large and small, and in the more recent explosion of small handheld devices.

In addition to the applications described above, many other applications of the methods and systems disclosed and envisioned herein are possible.

A. Calculating Uncertainty Using Chordals

According to an embodiment, a method for calculating uncertainty using chordals involves four aspects. According to a first aspect, the method defines a format for communicating numbers with uncertainty or error. According to a second aspect, the method establishes that the chordal is both numeric and geometric. According to a third aspect, the method performs chordal arithmetic. According to a fourth aspect, the method converts the calculated information to a dual number display format.

1. Dual Number Communication

According to an embodiment, a fundamental principle is to always communicate a value with errors or uncertainty, thereby forming what is herein called a 'dual number.' For example, a format can be used in which the value and its error (or uncertainty) is entered or displayed as individual numbers, but connected to each other so they are treated together as one unit. According to an embodiment, using alphabetic letters to represent numbers (algebra), a horizontal format example is shown in FIG. 1. Other format variations for dual number entry or display could include, but are not limited to: (i) a horizontal number format; (ii) a vertical number format; (iii) a diagonal number format; and/or (iv) a three-dimensional display, among many others. According to an embodiment, the dual number display or entry can include an extension, for example by including additional information in the form of a number (any type or resolution), text, color, symbol, and/or mark, among other types of variable information. Each component could then be available for entry, selection, and/or display.

For example, according to an embodiment the error can be considered bipolar and the display represents both +/− instances. Advanced entry or display could show the V symbol as a prefix to the error number and include the sign of the value (the plus, +, is explicitly shown for all positive numbers), such as the examples shown in FIG. 2. This dual number format arranges information so that it is displayed or entered. Data files or memory can also use this format of storing a value and its error, according to an embodiment.

The 'dual number' format is numeric but its use in calculations must respect geometric information, as error or uncertainty is a line object covering a range of possibilities while the value is a point object indicating just one instance. The challenge for uncertainty or error calculations is performing numeric calculation while respecting the distinct geometric status of values and their errors. This is done properly, for example, by using numeric arithmetic as well as geometric arithmetic.

2. Dual Number-to-Chordal Conversion

As noted above, according to an embodiment the dual number is a numeric display or entry that does not contain geometric information. Thus, the dual number must be converted to a geometric form prior to performing a calculation. According to an embodiment, therefore, is a method and/or system that utilizes a chordal format which is both numeric and geometric by collecting scaled points with geometric addition. The number placement can be as a scalar for a geometry, as shown in the following equation for numbers $x_1$ and $x_2$, and geometry $[p_1]$ and $[p_2]$:

$$\hat{x} = x_1[p_1] \oplus x_x[p_2] \quad (1)$$

The square brackets, for example, define distinct invariant points as free geometric elements and have the prefix of scalars that are numeric quantities.

The conversion from dual number to chordal can be accomplished by using scalar equations that are numeric and use an instance signature. Shown below, for example, are equations that can be utilized for converting dual number components into two chordal components:

$$X_1 \equiv X + \sigma_{x1} eX$$

$$X_2 \equiv X + \sigma_{x2} eX \quad (2)$$

Figure 3:
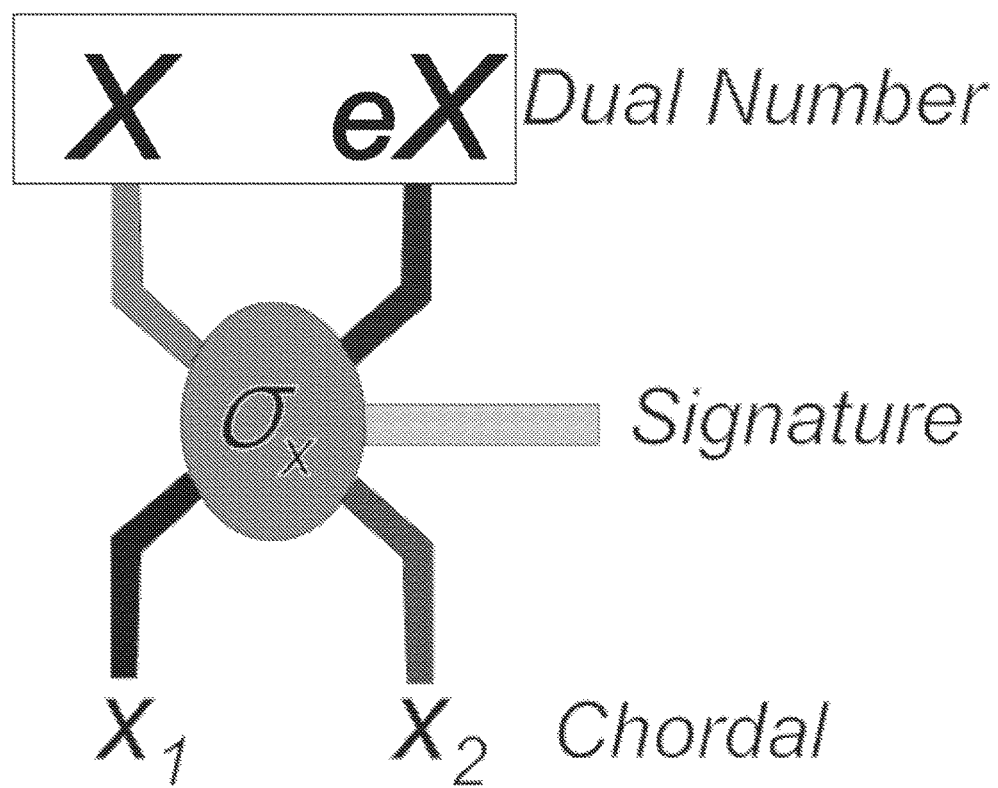
FIG. 3 is a dual number to chordal number conversion circuit in accordance with an embodiment.

The non-zero signatures in these equations assign how the error is combined with the value, x, to create the scalars for the chordal points. In this format the value and the error both contribute to each scalar inside the chordal. Shown in FIG. 3, for example, is a possible construct for dual number to chordal conversion according to an embodiment using a signature. FIG. 3 also represents a possible integrated circuit geometry that performs dual number to chordal conversion in a system.

3. Chordal Calculation

According to an embodiment, once a dual number is constructed and converted to a chordal, the chordal calculation(s) can be performed. In a general form, a chordal calculation may have, for example, a number of input chordals and one resulting chordal, such as that shown in the equations below:

$$\hat{f} = f(\hat{x}, \hat{y}, \hat{z}, \dots)$$

$$f_1 = f(x_1, y_1, z_1, \dots)$$

$$f_2 = f(x_2, y_2, z_2, \dots) \quad (3)$$

According to an embodiment, the chordal method can utilize a two-track calculation such that contributions are from two lists of inputs shown within the function's parentheses. With two possible tracks, how input chordals are tracked depends on a signature that has two possible settings.

Most calculations involve combinations and sequences of one or more of four main arithmetic operations, namely addition, subtraction, multiplication, and division. To further understand the chordal method, it is beneficial to explain what it does using the known organizational structure and language of the 'group.' A group is a mathematical structure defined by seven axioms using specific language:
1. Elements—what it is
2. Binary Operation—two elements at a time are considered
3. Closure—the result of the binary operation is another element
4. Identity element
5. Inverse elements
6. Associativity
7. Commutativity According to an embodiment, a chordal is the geometric addition of scaled points, and a group can be formed for both 'chordal addition' and 'chordal multiplication' shown in the examples below. Analysis benefits from the group structure's chordal inverse elements by obtaining 'chordal subtraction' and 'chordal division' for free.

Chordal Example 1—Chordal Addition Group Arithmetic

In this example, the chordals form a group for addition. This can be accompanied by an identity element and inverse element to enable chordal subtraction by adding an inverse element. This follows the binary geometric operation format where the object is on the left and the modifying subject is on the right to create a resultant:

$$\text{Resultant=Object} \oplus \text{Subject as letters } R = o \oplus s \quad (4)$$

The geometric addition of two chordals is commutative and associative as scalars are combined on distinct-point-elements:

$$\hat{o} \oplus \hat{s} \equiv (o_1[p_1] \oplus o_2[p_2]) \oplus (s_1[p_1] \oplus s_2[p_2]) \quad (5)$$
$$= (o_1 + s_1)[p_1] \oplus (o_2 + s_2)[p_2]$$

The resultant is a chordal and this shows that the addition group is closed:

$$\hat{R} = R_1[p_1] \oplus R_2[p_2]$$

$$\text{where } R_1 = o_1 + s_1 \text{ and } R_2 = o_2 + s_2 \quad (6)$$

The chordal addition has two tracks that remain intact and do not interact. The identity chordal is found by posing the resultant as a source chordal. For example, with the subject chordal taken as the identity chordal, the resultant chordal is the object chordal:

$$\hat{s} = \hat{i} \text{ such that } \hat{R} = \hat{o}$$

then $\hat{o} = \hat{o} \oplus \hat{i}$ then $\hat{i}$ is the identity chordal for addition (7)

By substitution and evaluation of distinct-point scalars, the identity chordal is found:

$$\hat{i} = 0[p_1] \oplus [p_2] \quad (8)$$

Now, equipped with the identity element, the inverse elements can be grasped. This is done by posing the resultant chordal as the identity chordal:

$$\hat{s} = \hat{y}$$

$$\hat{o} \oplus \hat{y} = \hat{i}$$

$$(o_1 + y_1)[p_1] \oplus (o_2 + y_2)[p_2] = 0[p_1] \oplus 0[p_2] \quad (9)$$

Then this particular subject chordal is the inverse of the object chordal. Chordal subtraction is accomplished by adding an inverse chordal. For example, scalars work in balance $$o_1 + y_1 = 0 \text{ where } y_1 = 0 - o_1 \quad (10)$$

Chordal Example 2—Chordal Multiplication Group Arithmetic

The chordals form a group for multiplication. This is accompanied by an identity element and inverse element to enable chordal division by multiplying by an inverse element. This follows the binary geometric operation format where the object is on the left and the modifying subject is on the right to create a product:

$$\text{Product=Object} \otimes \text{Subject as letters } P = o \otimes s \quad (11)$$

The geometric multiplication of two chordals is associative but not necessarily commutative:

$$\hat{o} \otimes \hat{s} \equiv (o_1[p_1] \oplus o_2[p_2]) \otimes (s_1[p_1] \oplus s_2[p_2]) \quad (12)$$
$$= (o_1 \times s_1)[p_1 \otimes p_1] \oplus (o_2 \times s_1)[p_2 \otimes p_1] \oplus$$
$$(o_1 \times s_2)[p_1 \otimes p_2] \oplus (o_2 \times s_2)[p_2 \otimes p_2]$$

There are four novel product elements (shown in bold above) each one having its own scalar (in parentheses above). Closure for chordal multiplication requires two axioms, one for a self-product, one for a distinct product, both producing the object point:

$$[p_J \otimes p_J] = +1[p_J]$$

$$[p_J \otimes p_K] = 0[P_J] \quad (13)$$

Then, using extinction, the geometric multiplication of chordals reduces to:

$$\hat{o} \otimes \hat{s} = (o_1 \times s_1)[p_1] \oplus (o_2 \times s_2)[p_2] \quad (14)$$

This product is a chordal and this shows that the multiplication group is closed and commutative:

$$\hat{P} = P_1[p_1] \oplus P_2[p_2]$$

$$\text{where } P_1 = o_1 \times s_1 \text{ and } P_2 = o_2 \times g_2 \quad (15)$$

The chordal multiplication has two tracks that stay intact and do not interact. The identity chordal is found by posing the product as a source chordal. For example:

$$\hat{s} = \hat{u} \text{ such that } \hat{P} = \hat{o}$$

then $\hat{o} = \hat{o} \otimes \hat{u}$ then $\hat{u}$ is the identity chordal for multiplication (16)

By substitution and evaluation of the scalars:

$$\hat{u} = 1[p_1] \oplus 1[p_2] \quad (17)$$

Now, equipped with the identity element, the inverse elemnts can be outlined. This is done by posing the product chordal as the identity chordal:

$\hat{s} = \hat{y}$ $\hat{o} \otimes \hat{y} = \hat{u}$ $$(o_1 \times y_1)[p_1] \oplus (o_2 \times y_2)[p_2] \oplus 1[p_2] \quad (18)$$

Then the subject chordal is the inverse of the object chordal. Chordal division is accomplished by multiplying by an inverse chordal. For example, scalars:

$$o_1 \times y_1 \equiv 1 \text{ where } y_1 = 1 \div o_1 \quad (19)$$

Chordal Example 3—Recursive Chordal Calculations

The above two examples are binary operations having two input chordals. According to an embodiment, a sequence of binary operations can be represented unambiguously as one large operation with multiple inputs if the operations used are associative. Associativity can be shown by demonstrating that two alternatives of a repeated binary operation among three chordals are equivalent. Using results from Example 2 above, the two alternatives are from using a product as an object or using a product as a subject in a second round of multiplication:

$$\begin{aligned}
\hat{a}_1 &\equiv [\hat{o} \otimes \hat{s}] \otimes \hat{t} = [(o_1 \times s_1)[p_1] \oplus (o_2 \times s_2)[p_2]] \otimes \\
&\quad [t_1[p_1] \oplus t_2[p_2]] \\
&= (o_1 \times s_1 \times t_1)[p_1 \otimes p_1] \oplus \\
&\quad (o_2 \times s_2 \times t_1)[p_2 \otimes p_1] \oplus \\
&\quad (o_1 \times s_1 \times t_2)[p_1 \otimes p_2] \oplus \\
&\quad (o_2 \times s_2 \times t_2)[p_2 \otimes p_2]
\end{aligned} \quad (20)$$

$$\begin{aligned}
\hat{a}_2 &\equiv \hat{o} \otimes [\hat{s} \otimes \hat{t}] = [o_1[p_1] \oplus o_2[p_2]] \otimes [(s_1 \times t_1)[p_1] \oplus \\
&\quad (s_2 \times t_2)[p_2]] \\
&= (o_1 \times s_1 \times t_1)[p_1 \otimes p_1] \oplus \\
&\quad (o_1 \times s_2 \times t_2)[p_1 \otimes p_2] \oplus \\
&\quad (o_2 \times s_1 \times t_1)[p_2 \otimes p_1] \oplus \\
&\quad (o_2 \times s_2 \times t_2)[p_2 \otimes p_2]
\end{aligned}$$

Following the axioms from Example 2, the distinct products (in bold above) are extinct and this maintains the chordal calculation on two tracks that do not interact:

$$\hat{a}_1 = [\hat{o} \otimes \hat{s}] \otimes \hat{t} = (o_1 \times x_1 \times t_1)[p_1] \oplus (o_2 \times x_2 \times t_2)[p_2]$$

$$\hat{a}_2 = \hat{o} \otimes [\hat{s} \otimes \hat{t}] = (o_1 \times s_1 \times t_1)[p_1] \oplus (o_2 \times s_2 \times t_2)[p_2] \quad (21)$$

Since the two alternatives are the same, the chordal multiplication is associative. A simpler example shows that the chordal addition is also associative. Since the chordal arithmetic is associative, a sequence of operations is the same as one large operation.

Figure 4:
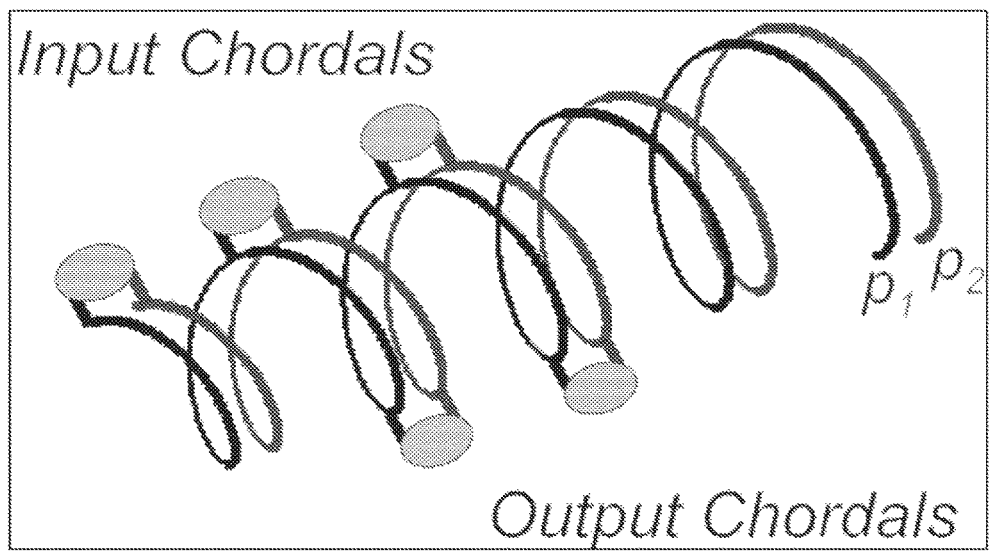
FIG. 4 is a diagram of a parallel track chordal calculation in accordance with an embodiment.

As an example, FIG. 4 demonstrates a construct for the chordal calculations proceeding on two parallel and non-interacting tracks according to an embodiment. Chordal information is both numeric and geometric and this is shown conceptually as one chordal input onto two tracks of an expanding spiral, progressing from inputs to outputs. The recursive calculation is shown through the access of intermediate chordal results and then their reuse in subsequent chordal calculations. Thus, FIG. 4 demonstrates a chordal calculation that has many chordal inputs and intermediate chordal results that can be output. Information on each track continues to be used as the spiral progresses

4. Chordal to Dual Number Conversion

According to an embodiment, at any stage in the calculation intermediate or final answers are available. The display of answers is by converting back to the dual number format for numerical display. This information could also be used for geometric rendering on graphs. Values and errors interact in the calculations because all input chordals combined them into each point instance. Upon reporting, the value and the error must be extracted to be separate again, as if they are sources for subsequent calculations.

The conversion from a chordal-to-dual number is performed consistent with the dual number-to-chordal conversion described above. According to an example, it is proposed that the 'answer chordal' is from a source dual number following the scalar equations shown above:

$$y_1 = y + \sigma_{y1} ey$$

$$y_2 = y + \sigma_{y2} ey \quad (22)$$

Then the extraction is to reverse this using the numerical difference and numerical sum of the source chordal point's scalars:

$$2y + (\sigma_{y2} + \sigma_{y1}) ey = y_2 + y_1$$

$$0y + (\sigma_{y2} - \sigma_{y1}) ey = y_2 - y_1 \quad (23)$$

According to an embodiment, when the signatures are the same the second equation is degenerate and the value and its error cannot both be extracted. Therefore the signatures must be distinct. Accordingly, the chordal to dual number conversion requires that the chordal definitions be distinct. Considering the legal values of the signatures, this can be expressed using one common signature and distinct signs. The two choices of definitions are handled by the two choices of the one signature as $[-1:+1]$:

$$\sigma_{y2} = +1\sigma_y$$

$$\sigma_{y1} = -1\sigma_y \quad (24)$$

This changes the equations, isolating unknown dual number components, as:

$$2y + 0ey = y_2 + y_1$$

$$0y + 2\sigma_y ey = y_2 - y_1 \quad (25)$$

The extraction of the value is unique as shown in the equation below. Indeed, the extraction of the error is unique to within a non-zero signature:

$$y \equiv \frac{1}{2}(y_2 + y_1) \quad (26)$$

$$ey \equiv \sigma_y \frac{1}{2}(y_2 - y_1)$$

For any input chordal, its explicit value of signature is by choice. However, for proper assignment as an input to a function, its role as an input inherits context from the function according to the chordal's role in the function. In other words, the chordal input has to plug-in the correct way, and the signature value is set by signature of its role in the function. For example, there are sample roles as the chordal is input to a function:

Role 1. Into an addition, then its signature is $[+1]$;
Role 2. Into a subtraction, then its signature is $[-1]$;
Role 3. Into a multiplication, then its signature is $[+1]$; and
Role 4. Into a division, then its signature is $[-1]$.

In the case of a composite function, such as division of a subtraction, the signature is the product of the individual operation signatures. This way, the role of the chordal in the function determines the signature of its conversion or by how the two instances are placed on two calculation tracks.

In a calculation stream, the signature inputs are not free and are connected. However, these signature determinations are local to the function's input and are used at only that stage of the calculation. This is one disadvantage of the chordal method that follows two tracks. There is no opportunity to revisit the impact of a chordal input and account for multiple inputs of the same chordal. On the other hand, that is what keeps the method simple and easy to follow on its progression. At any stage of the calculation's progression, intermediate results of the value and error are displayed in the dual number format shown below:

$$\tilde{y}=[y\ ey] \quad (27)$$

The below equation demonstrates, for example, that the Dual Number to Chordal conversion, in order to be consistent with the reverse conversion, uses one common signature with two distinct signs. Again, this one signature is determined by the chordal's role in the function:

$$y_1 \equiv y - \sigma_y ey$$

$$y_2 \equiv y + \sigma_y ey \quad (28)$$

Figure 5:
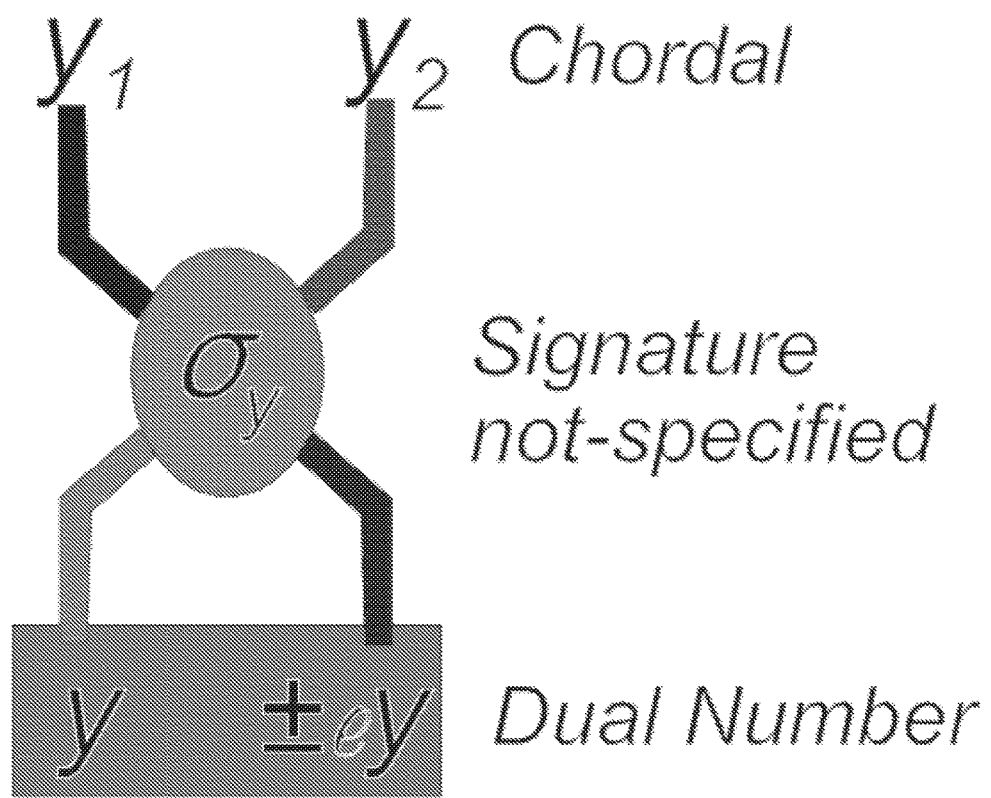
FIG. 5 is a chordal to dual number conversion circuit in accordance with an embodiment.

FIG. 5 demonstrates one possible construct for the Chordal-to-Dual Number conversion, according to an embodiment. Although this is presented as a construct, it could also serve as an integrated circuit in a system that performs this conversion. In this case, the dual display's feature of a bipolar number accounts for both possible signature values and does not require an explicit determination a single signature value. This is done such that the displayed number for the error is a magnitude with no sign and the signature is displayed as bipolar ∀.

Chordal Method for Calculating Uncertainty

The chordal method culminates in a combination of the four steps described above. First, the dual numbers are used for display and entry of values and errors. Second and fourth, the dual numbers are converted, back and forth, respectively, to and from chordals. And third, chordal calculations, at the core of the method, are fed and feed these conversions. The entire method combines these parts to form embodiments of the chordal method.

Figure 6:
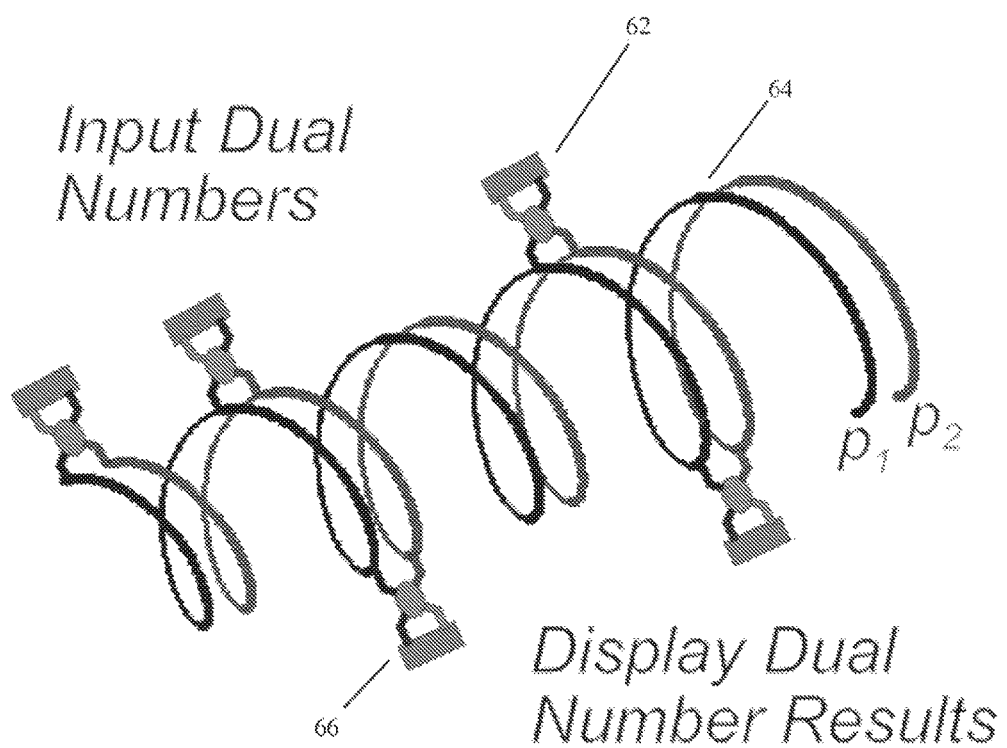
FIG. 6 is a diagram of a chordal uncertainty calculation method in accordance with an embodiment.

According to one embodiment, FIG. 6 demonstrates, for example, a method for calculating uncertainty including the steps of: (1) converting from dual numbers to chordals (shown with numeral 62); (ii) chordal calculations proceeding on two tracks (shown with numeral 64); and (iii) converting back to dual numbers when intermediate or final display is desired (shown with numeral 66). Each conversion requires one signature, and conversions place information onto or off the two tracks anywhere along it. For clarity, the inputs are placed on the top edge while outputs are on the bottom edge, although this is not a limitation of the present method or system.

Figure 7:
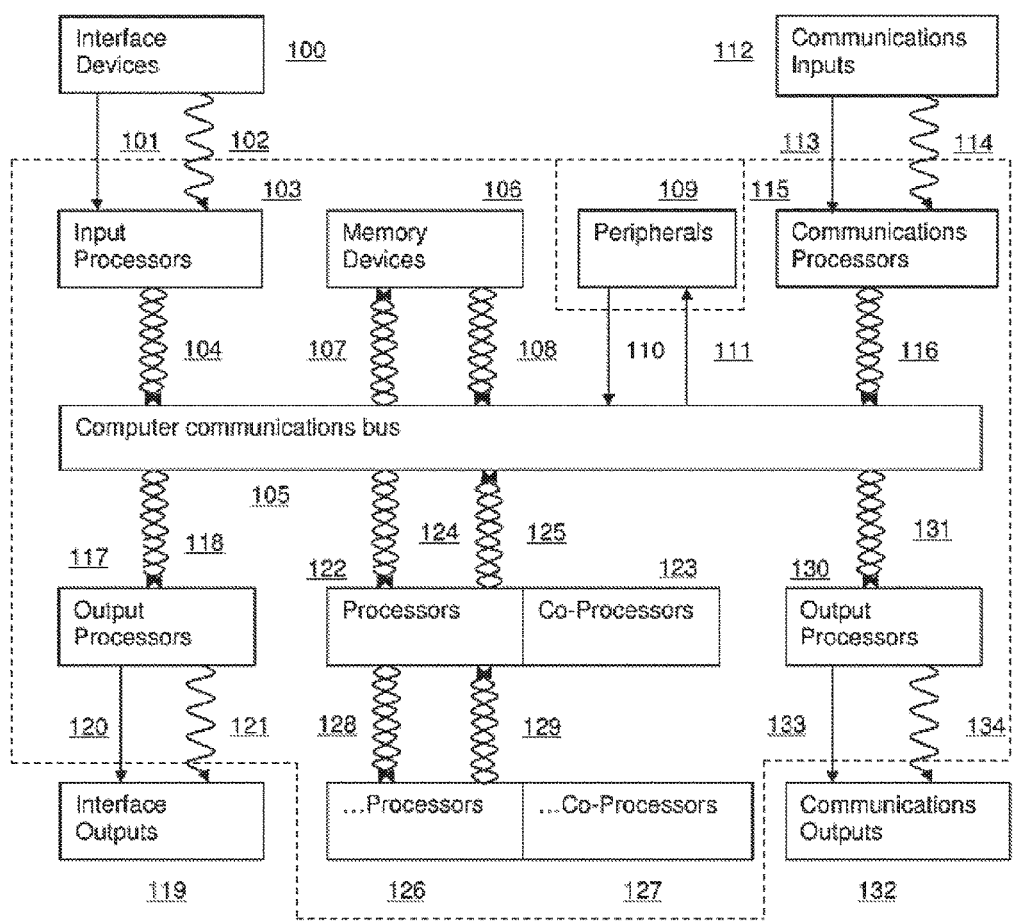
FIG. 7 is diagram of a system for calculating uncertainty using chordals in accordance with an embodiment.

Demonstrated in FIG. 7 is a computerized system 99 for calculating uncertainty according to one or more of the embodiments described or envisioned herein. System 99 may be a computing device, including but not limited to, a desktop computer, smartphone, tablet or other mobile computing device that is configured for processing computer executable instructions that allows for the receipt of input data, processing of said input data and outputting of resolved data and its associated error or uncertainty. The system comprises, for example, a plurality of interface devices 100 used for interfacing the user, such as a human, with the computerized system, and can include for example, a microphone, camera, alpha-numeric keyboard, scrolling mouse, pointing devices, touch pads, buttons or bio-sensors. Signal data 101 is obtained from the interface devices in the form of primary data with no uncertainty or error (represented by the straight line with an arrow). Signal data 102 may also be obtained from the interface devices in the form of primary data as uncertainty or error rated due to multiple instances, quantization, and/or noise (represented by the oscillating curve with an arrow).

Input processors 103 convert the two inputs into chordal data that are two instances of the same weight for each channel (represented by two parallel spiraling curves with arrows), and at 104 the chordal data (being two instances of the same weight for each channel) is input to the bus 105. Bus 105 is, according to an embodiment, the main computer bus for communication of all hardware and application data.

The system can also comprise one or more memory devices 106 for storage and retrieval of computer configuration data, chordal operation data, archived chordal data, run-time application data and archived application data. Memory devices 106 may include, for example and without limitation thereto, read only memory (ROM), random access memory (RAM), an operating system, a basic input/output system (BIOS), application programs, and program data. There may also be one or more peripherals 109 used to enhance the application and documentation such as scanners, printers, projectors and portable memory devices. In accordance with an embodiment, chordal data is transferred from the computer bus to the memory devices at 107, and from the memory devices to the computer bus at 108. At 110, there can be data communication of an unspecified format from the peripherals to the bus, and at 111 there can be data communication of an unspecified format from the bus to the peripherals.

The system can also comprise communications input(s) 112 from outside the computer and/or from other computer hardware such as memory devices, intranet, internet, cloud data, satellites, LAN, and/or VPN. Signal data 113 is obtained from communications inputs 112 in the form of primary data with no uncertainty or error, and signal data 114 is obtained from communications inputs 112 in the form of primary data as uncertainty or error rated due to multiple instances, quantization or noise. The signal data 113 and 114 is fed into a communications processor 115 that converts the two inputs into chordal data that are two instances of the same weight for each channel. The generated chordal data 116 is then input into the communications bus 105.

The system can also comprise output processor(s) 117 adapted or configured to convert the chordal instances into resolved primary data and uncertainty or error data. Chordal data 118 is transferred from the bus to the output processor, processed, and signal data 120 is transmitted to an interface output 119 in the form of primary data with no uncertainty or error. Similarly, signal data 121 is transmitted to an interface output 119 in the form of resolved data as uncertainy or error. Interface output 119 can be, for example, an output device used for the human interface with the local computer including but not limited to audio speakers, lights, monitor displays, touch pad, numerical di splay or bio-actuators.

The system can also comprise a main processor 122 for manipulating hardware function data or chordal data communicated on the bus and to other processors. The system may also include a co-processor 123 associated with the bus through the main processor, and configured or adapted to support operations to reduce tasks on the main processor. According to an embodiment, chordal data 124 is transmitted from the bus to the main processor, and chordal data 125 is transmitted to the bus from the main processor. The system can include additional processors 126 for manipulating hardware function data or chordal data communicated on the bus, as well as one or more co-processors 127 associated with each additional processor, reducing the task on each processor. According to an embodiment, chordal data 128 is transmitted from the main processor to the additional processors, and chordal data 129 is transmitted to the main processor from the additional processors.

The system can also comprise, for example, one or more output processors 130 configured or adapted to convert the chordal instances into resolved communications data and uncertainty or error data. According to an embodiment, chordal data 131 is transferred from the bus to the output processor. The system can comprise one or more communications outputs 132 from the local computer, including but not limited to memory devices, intranet, internet, cloud data, satellites, LAN and/or VPN. Signal data 133 can be transmitted to the communications outputs in the form of primary data with no uncertainty or error, and signal data 134 can be transmitted to the communications outputs in the form of resolved data as uncertain or error.

B. Calculating Uncertainty Using Duals

According to an embodiment, a method for calculating uncertainty using duals for calculating uncertainty involves six aspects. According to a first aspect, the method comprises duals as a hybrid of numeric and geometric information. According to a second aspect, the method provides formatting operations to enable calculations with duals. According to a third aspect, the method utilizes arithmetic calculations using duals that rely on geometry to organize the structure. According to a fourth aspect, the method defines special subject duals that transform object duals into special duals. According to a fifth aspect, the method renders duals to enable the graphical or numeric display. According to a sixth aspect, the method uses signatures to guard against divide by zero and ensure real solutions.

1. Source of Duals

According to an embodiment, a source of duals is in two parts, with one part being an assessment of value and the other part being a measure of error or uncertainty for that assessment. Quantization is the assessment of the physical event with a finite number of classes.

Figure 8:
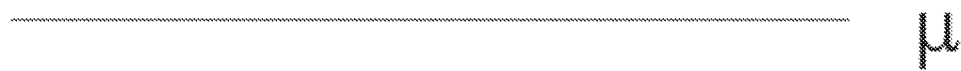
FIG. 8 is a continuous line for one physical attribute, in accordance with an embodiment.

For example, the concept of the number line is instructive to illustrate the source of measurement values and the source of errors. An instance of a physical attribute is interpreted as a point instance on an infinite continuous line; since the line is a continuous object, the possible physical instance is considered continuous. FIG. 8, for example, depicts the greek letter Mu ($\mu$) to label a continuous line to represent one physical attribute.

Figure 9:
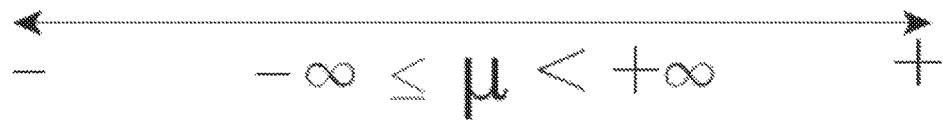
FIG. 9 is a continuous axis for one physical attribute in accordance with an embodiment.

The adoption of an undetermined physical reference called a "datum" places directions on the line. FIG. 9, for example, demonstrates that there are two directions away from any datum labeled as '+' for above direction and '−' for below direction. This completes the infinite continuous physical axis. As a result, any point chosen on the axis has two directions away from it.

Figure 10:
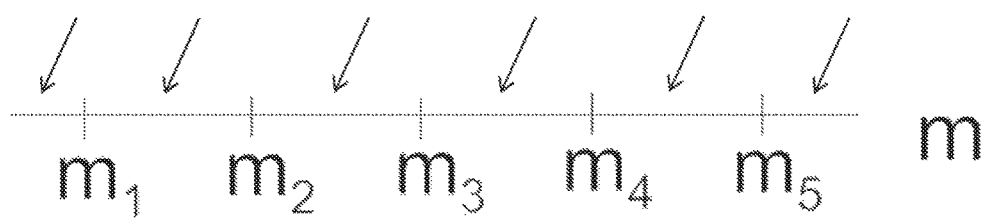
FIG. 10 is an example grid with five classes ($m_1$, $m_2$ ... $m_5$) in accordance with an embodiment.
Figures 11, 12, 13:
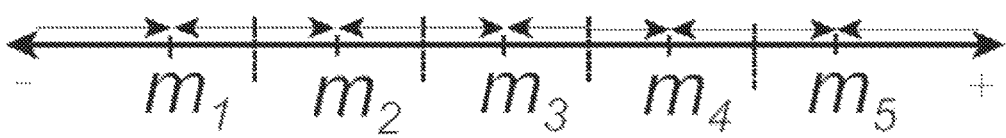
FIG. 11 is a grid equation example in accordance with an embodiment.
FIG. 12 is a segment example in accordance with an embodiment.
FIG. 13 is an example grid depicting intervals resulting from the nearest rounding, in accordance with an embodiment.

Similar to the physical axis, the measurement axis starts with a line but this is just a guide. According to an embodiment, the adoption of a grid of points defines a countable number of measurement classes. FIG. 10, for example, depicts an example with five classes [$m_1, m_2 \ldots m_5$]. Each pair of class points bounds one piece of the continuous line and this is called an increment. The increment is the basis for a grid equation. For example, FIG. 11 depicts a uniform grid equation that is initiated at the first class and builds upward by adding a count of increments. Therefore, by count, there is always one less increment than the number of classes.

With a continuous physical axis as a source and the measurement grid as a destination, the measurement process is the placement of physical instances into the finite classes of the measurement grid. Superimposing the measurement grid onto the infinite physical axis sub-divides the one whole physical axis (FIG. 9) into segments of three types:

1. Semi-infinite segment at the minimum class (lower boundary);
2. Semi-infinite segment at the maximum class (upper boundary); and
3. Finite segment between maximum and minimum classes (grid interior).

For example, FIGS. 10 and 12 demonstrate that, with five classes, there are six segments (marked with arrows in FIG. 10). This defines ownership of each point by one of the segments, but segment one has no point. Therefore there is a miscount between the number of increments, number of classes, and number of segments. This is resolved by using a rounding process to associate intervals of the physical axis to each one of the classes. Nearest rounding is shown in FIG. 13 and covers the entire physical axis by rounding intervals to each class point. The intervals each have boundaries that are half-way between class points. The rounding process is the measurement and is the source for the dual's value component.

Similar to segments, there is a list of intervals such that there are two special intervals at the grid boundaries. FIG. 14 demonstrates that each interior interval is defined about the class using only the measured value and half the scale increment. The two grid boundary intervals cover a semi-infinite part of the physical axis. Since the intervals define a range of physical instances that are not exactly at the discrete measurement points, there is a continuous range of errors. FIG. 15, for example, shows two definitions of error. The physical error takes the measurement point as a datum and the interval appears as a finite version of the physical axis. The measurement error is an opposite and is the negated physical error.

Figures 16, 17:
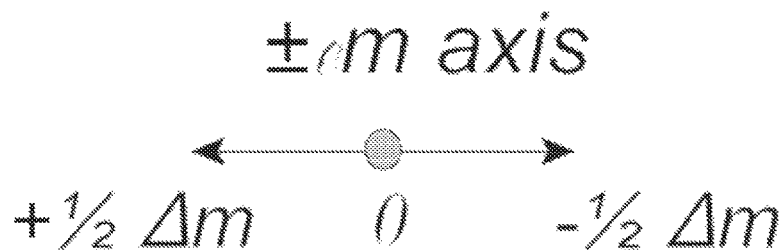
FIG. 16 is an example of errors in accordance with an embodiment.
FIG. 17 is a diagram of error vectors for an interior grid point in accordance with an embodiment.

According to an embodiment, this measurement error definition can be applied to each interval to determine the error interval around each measurement point. FIG. 16 shows an example of the measurement error ranges with five classes. The boundary points have semi-infinite error intervals and the interior of the measurement grid has finite error intervals with limits of +/− half the increment. This defines the source of error for all measurement points.

Figures 18, 19:
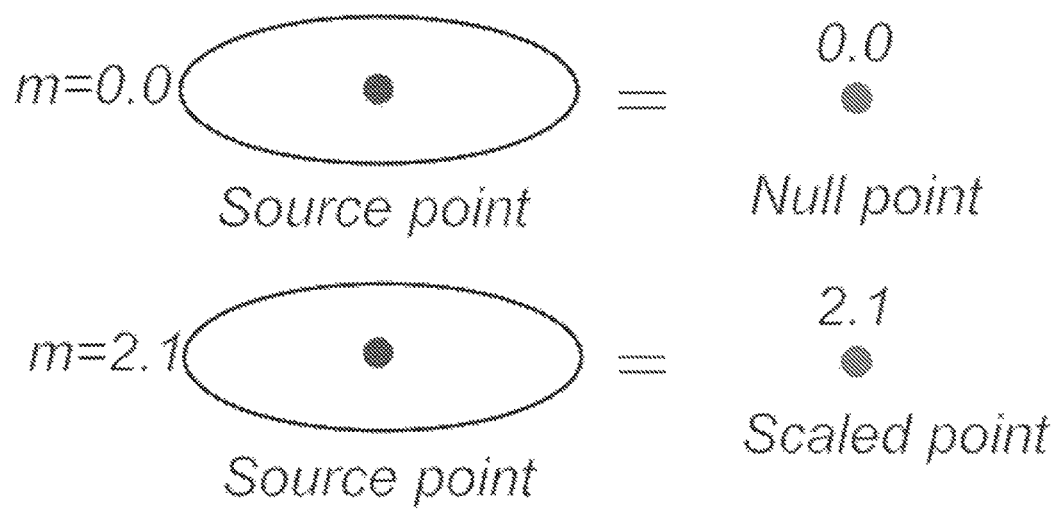
FIG. 18 is a formula for duals definition as scaled point and scaled vector in accordance with an embodiment.
FIG. 19 is a diagram of the scaling of a point, in accordance with an embodiment.

For example, FIG. 17 demonstrates that the measurement error axis inherits directional arrows from the physical axis and the error is a vector. Due to the error definition, the directional arrows for the measurement error vectors are opposite to those from the physical error vectors or physical axis. Therefore the source of error for the dual is an error vector. FIG. 17 also shows the correct geometric configuration of a dual as a geometric addition of a point (for the measurement value) and an error vector (for the measurement error). FIG. 18 defines duals as a geometric addition of a scaled point and a scaled error vector. In the uncertainty calculations, the scalar for the point is the number corresponding to the value on the measurement grid.

Figure 20:
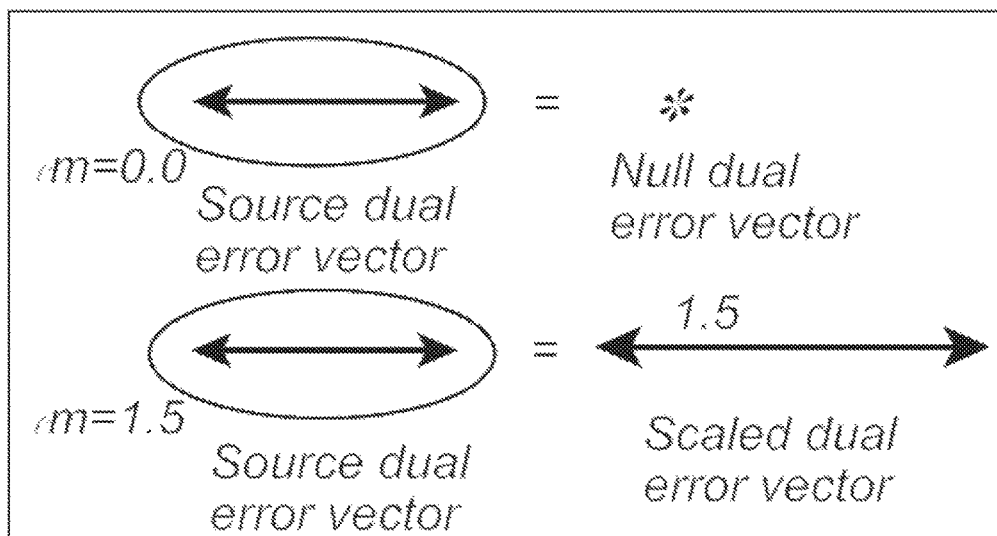
FIG. 20 is a diagram of the scaling of an error vector in accordance with an embodiment.

FIG. 19 depicts the geometric interpretation of the scaled point. The geometry remains a point while the scalar gives the point weight. Similarly, FIG. 20 shows the geometric interpretation of the scaled error vector. The geometry remains a double-arrow vector but its relative length is sized according to its scalar. The error vector is the error limit corresponding to the size of the interval on the measurement grid. Although the error vector is scaled by the interval's limits, the actual error is unknown but falls anywhere between the interval's limits. The error vector, as a line object, covers these possibilities and that is why the geometric information is important in the duals method.

2. Formatting Operations

The formatting of the dual determines how the scalars interact with the geometry. According to an embodiment, the formatting of a dual is in two opposite ways (forward and reverse), with one being the join and one being the split. These dictate the geometric format and availability of scalar numbers for calculations.

Dual Example 1—A Dual Object has Join and Split Operations

According to this example, "Join" is an operation in which dual geometry is defined from two scalar numbers using a join operation:

$$\text{Dual } \tilde{o} = J(o, eo) = o[o] \oplus eo[v] \quad (29)$$

Similarly, "Split" is an operation in which two scalar numbers are extracted from a dual geometry using a split operation:

$$\text{Number } o \equiv S_p(\tilde{o})$$

$$\text{Number } eo \equiv S_v(\tilde{o})$$

$$\text{or } [o \; eo] \equiv S(\tilde{o}) \quad (30)$$

This accepts the idea that numerical calculations are performed on scalars and these must be available without geometry. While the arithmetic for scalar numbers is well-known, the new arithmetic for the entire dual must follow the structure imposed by the geometry.

For example, an operation on an object dual is one that modifies it and creates a result dual. This geometric arithmetic has the modification of an object formatted as an unary function:

$$\tilde{r} = \text{Operation Name}(\tilde{o}) \quad (31)$$

This function format has the Name on the left, a container of parentheses for the object dual and the answer is assigned to the result dual. When the object is specified, this is the forward operation.

With this format shown in Example 1, special duals are generated by making particular choices and this can complete the dual addition group and dual multiplication group with identity duals and inverse duals. Table 1 below shows the special duals being considered and is a guide for naming the operator and result, according to an embodiment.

TABLE 1

Naming Operations - Example Object Dual = 0.6[p] ρ 1.27[v]

| Name of Result Dual | Unary Operation Name | Example Result Dual |
|---|---|---|
| CLIENT | LAFLEUR, RONALD S. | LA290 |
| MATTER | TRANS-IMAGINARY CHORDALS IMPLEMENTATION OF THE DUALS METHOD FOR CALCULATING UNCE | 106923 |
| CATEGORY | APPLICATION | APP |
| AUTHOR | DANELLA, DENNIS | DBD |
| TYPIST | DANELLA, DENNIS | DBD |
| EVENT | PATENT MATTER (MISCELLANEOUS) | PAT |

This contains three fundamental operations and three composite operations that are built from fundamental operations. Table 2, below, outlines three kinds of result choices according to the use of definite numbers (in this case the number 0 in bold).

TABLE 2

Kinds of Named Result Duals

LAFLEUR, RONALD S.
TRANS-IMAGINARY
CHORDALS IMPLEMENTATION OF THE DUALS
METHOD FOR CALCULATING
UNCE APPLICATION
DANELLA, DENNIS
DANELLA, DENNIS

| | Specified Result Indefinites (object scalars) | Specified Result Definites (zero scalars) | Named Result | General Result Dual |
|---|---|---|---|---|
| First | 2 o and Θo | 0 | Object Conjugate Flipped | o[p] ρ + Θo[v] o[p] ρ !Θo[v] Θo[p] ρ o[v] |
| Second | 1 o or Θo | 1 0 or 0 | Point Error Vector | o[p] ρ 0[v] 0[p] ρ Θo[v] |
| Third | 0 | 2 0 and 0 | Null | 0[p] ρ 0[v] |

The result choices of the first kind are fundamental but are linked to the object's scalars. The second kind choices are composites of the first kind. This serves to create a definite number by combining fundamental object duals and reducing the influence of the object. The third kind of choice is also composite but uses only definite numbers, with no influence of the object's scalars.

Dual Example 2—Results from Compounding Fundamental Operations

The second kind of chosen results could be generated from the three fundamental results:

$$\text{Point} = \text{Nullify Error Vector(Object)} \quad (32)$$
$$= \frac{1}{2}[\text{Identify Plus(Object)} \oplus \text{Identify Minus(Object)}]$$

$$\text{Error Vector} = \text{Nullify Point(Object)}$$
$$= \text{Flip}\left(\frac{1}{2}[\text{Identify Plus(Flipped)} \oplus \text{Identify Minus(Flipped)}]\right)$$

The co-scalar of ½ is applied to all components of the dual to insure invariance of the significant object scalar.

The third kind is a composite of the second kind results as the remaining significant scalar is nullified $$\text{Null} = \text{Nullify(Object)} \quad (33)$$
$$= \text{Nullify Error Vector(Nullify Point(Object))}$$
$$= \text{Nullify Point(Nullify Error Vector(Object))}$$

For each measurement axis, there is only one null dual and it is determined without influence of the object's scalars. It is represented numerically as an exact zero. Further operations on the null dual do not change it.

3. Arithmetic of Duals

Most calculations involve combinations and sequences of four arithmetic operations, namely addition, subtraction, multiplication and division. To accomplish dual subtraction, an inverse dual is added. To accomplish dual division, an inverse dual is multiplied. In this way, the arithmetic of duals utilizes only dual addition and dual multiplication. The inverse duals are examples shown below.

Figure 21:
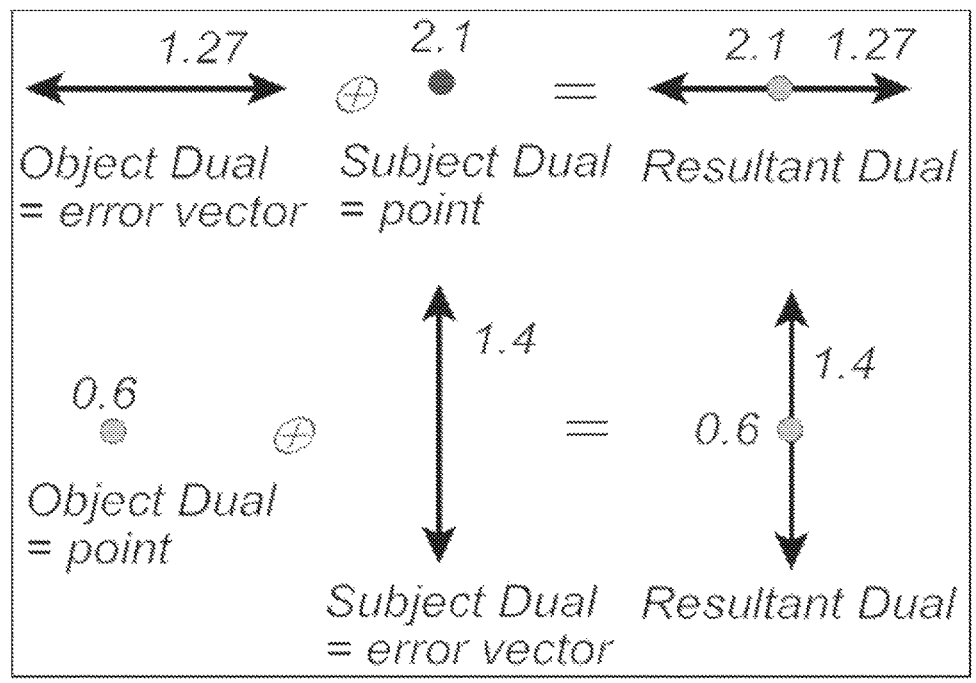
FIG. 21 is diagram of the calculation of dual from point and vector, in accordance with an embodiment.

A dual is the geometric addition of a scaled point and a scaled vector. Corresponding to the algebra of FIG. 18, FIG. 21 shows the geometric interpretation of adding a point to an error vector or adding an error vector to a point. The result is a dual object that has both a scaled point and a scaled vector. The first example of arithmetic is dual addition and this demonstrates closure, as the addition of two duals creates another dual.

Dual Example 3—Addition of Duals

Addition follows the binary geometric operation format where the object is on the left and the modifying subject is on the right to create a resultant:

$$\text{Resultant} = \text{Object} \oplus \text{Subject as letters } R = o \oplus s \quad (34)$$

The geometric addition of two duals is commutative and associative as scalars are combined on three distinct-geometries:

$$\tilde{o} \oplus \tilde{s} \equiv (o[p] \oplus eO[v_O]) \oplus (s[p] \oplus eS[v_S]) \quad (35)$$
$$= (o+s)[p] \oplus eO[v_O] \oplus eS[v_S]$$

FIG. 22 demonstrates how two points added together do not change the geometry but result in a larger weight. This corresponds to the bold term above.

The resultant is a dual and this shows that the addition group is closed because the resultant has a scaled point and a resultant that is still an error vector $$\tilde{R} = R[p] \oplus eR[v_R]$$

where $R = o + s$ $$\text{and } eR[v_R] = eo[v_O] \oplus es[v_S] \quad (36)$$

Figures 24, 25:
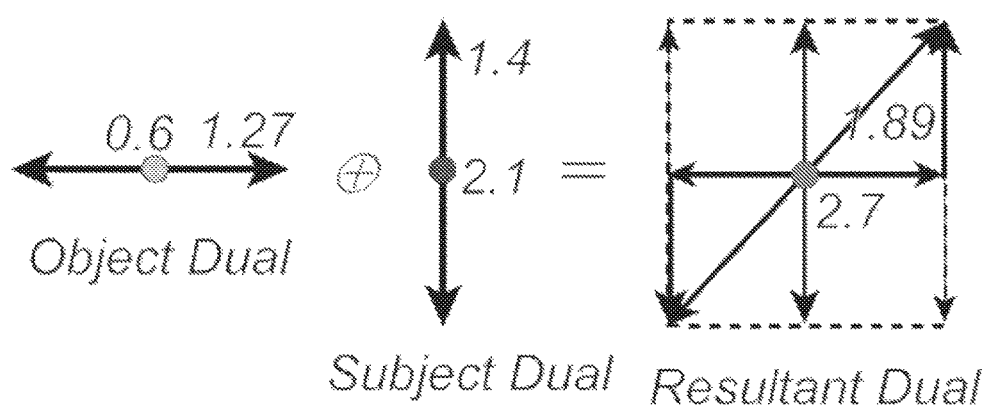
FIG. 24 is a diagram of addition of duals, in accordance with an embodiment.
FIG. 25 is a diagram of the geometric multiplication of a point object by a point subject, in accordance with an embodiment.

FIG. 23 shows how two error vectors are added together to form a resultant error vector. The relative scales and independent directions dictate the resultant. The scalar for the resultant error vector is found later, as discussed below in the Rendering section. The resultant's error vector is a sum of error vectors and this is open to higher dimensions while still retaining the dual format. The overall result of dual addition is shown in FIG. 24. The points are added and the error vectors are added simultaneously. The dual addition preserves the dual format of a measurement and its error. The determination of the resultant error vector's scalar requires self-multiplication of duals (see, for example, Example 9, below). The second example of arithmetic is dual multiplication and this demonstrates closure, as the multiplication of two duals creates another dual. This relies on the generation of four novel products that are converted back to the original dual format using four closure axioms.

Dual Example 4—Multiplication of Duals

Multiplication of duals follows the binary geometric operation format where the object is on the left and the modifying subject is on the right to create a product:

$$\text{Product} = \text{Object} \otimes \text{Subject as letters } P = o \otimes s \quad (37)$$

The geometric multiplication of two duals is associative but not necessarily commutative:

$$\tilde{o} \otimes \tilde{s} \equiv (o[p] \oplus eO[v_O]) \otimes (s[p] \oplus eS[v_S]) \quad (38)$$
$$= (o \times s)[p \otimes p] \oplus (eO \times s)[v_O \otimes p] \oplus$$
$$(o \times eS)[p \otimes v_S] \oplus (eO \times eS)[v_O \otimes v_S]$$

There are four novel product elements (shown in bold above) each one having its own scalar (in parentheses above). Closure for dual multiplication requires four axioms, one for a self-product of points, one for multiplication of an error vector by a point, one for multiplication of a point by an error vector and one for multiplication of error vectors. The self-multiplication of a point follows a closure with a signature called 'parity' (lower case p subscript):

$$[p \otimes p] \propto \sigma_p[p] \quad (39)$$

The value of the parity signature provides flexibility and can be determined later by special conditions. Application of this preserves the scalars $$(o \times s)[p \otimes p] = (o \times s)\sigma_p[p] \quad (40)$$

FIG. 25 illustrates an example of point multiplication. The corresponding calculation can be shown algebraically as (with parity of +1):

$$0.6[p] \otimes 2.1[p] = (0.6 \times 2.1)[p \otimes p] = 1.26[p] \quad (41)$$

Although it is not evident, by this example, the product point does not contain the geometry of the subject but it does show the impact of the subject point's scalar. The second axiom has the point as a subject multiplying an error vector object (with parity=+1):

$$[v \otimes p] = +1[v] \quad (42)$$

Application of this axiom preserves the scalars:

$$(eo \times s)[v_o \otimes p] \equiv (eo \times s)[v_O] \quad (43)$$

Figure 26:
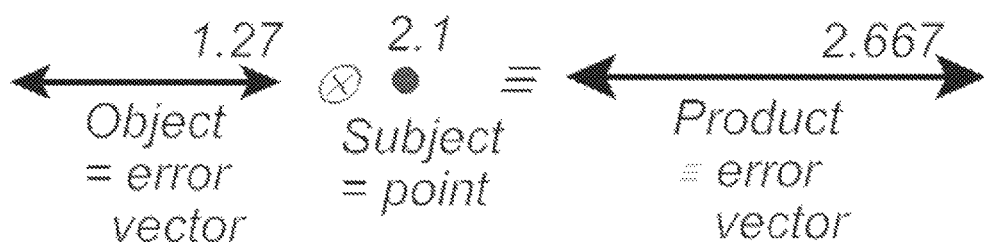
FIG. 26 is a diagram of the geometric multiplication of an error vector object by a point subject, in accordance with an embodiment.

FIG. 26, for example, illustrates that the point subject does not change the error vector object geometry but provides a way for scaling using a geometry to carry the number. The corresponding scalar is calculated by the following:

$$1.27[v] \otimes 2.1[p] = (1.27 \times 2.1)[v_O \otimes p] \equiv 2.667[v_O] \quad (44)$$

The product is an error vector with no subject point. The product does have the evidence or impact of the subject point as shown by the altered scalar. This closure is supported by the acceptance of the point as the geometric identity for multiplication. In dual form, it is an exact one (unit point and zero error).

The third axiom has the error vector as a subject multiplying a point object (with parity=+1):

$$[p \otimes v] \equiv +1[v] \quad (45)$$

Application of this axiom preserves the scalar but also requires a geometric interpretation:

$$(o \times es)[p \otimes v_g] \equiv (o \times es)[v_S] \quad (46)$$

Figure 27:
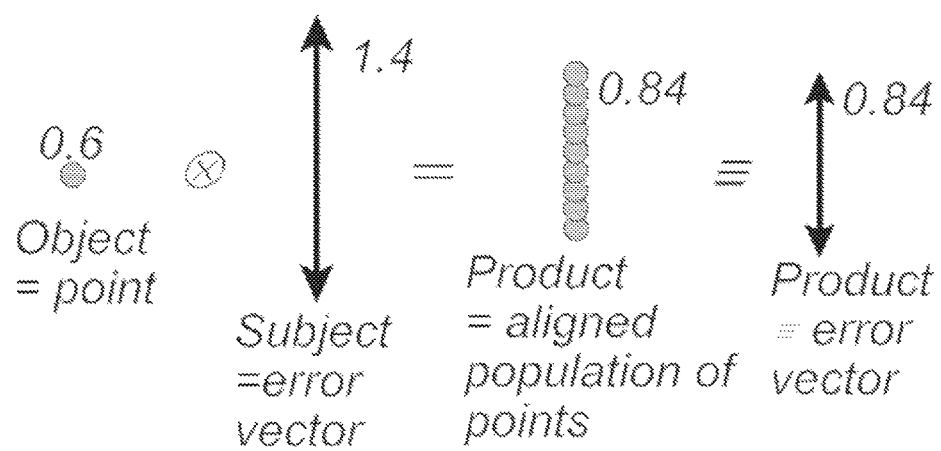
FIG. 27 is a diagram of the geometric multiplication of a point object by an error vector subject, in accordance with an embodiment.

FIG. 27 shows that the object point is repeated or extruded by the subject error vector. The raw product is a continuous population of points aligned along the subject error vector. FIG. 27 illustrates this with a limited number of object point copies. Since points do not occupy space, the copies actually do not overlap. The distance spanned by the product points is determined by the scalar multiplication such as $$0.6[o] \otimes 1.4[v_S] = (0.6 \times 1.4)[p \otimes v_S] \quad (47)$$

However, the product does not contain the geometry of the subject's error vector. By closure, the population of points is defined as a scaled version of the subject error vector. This can also be shown algebraically by using the special case of signature dual pair multiplication that is commutative.

The fourth axiom is a strong statement that defines duals, not only for display but also for continued calculations. There are two versions for handling the multiplication of error vectors. The first version is for 'self-products', when the object and subject error vectors are on the same measurement axis. This uses a closure signature specific to the error vector (upper case subscript for error vector signatures):

$$[v \otimes v] \propto \sigma_y[p] \quad (49)$$

This signature provides flexibility and can be determined later by special conditions. This can also be shown by an algebraic procedure but this is beyond the scope of this example.

A second version is for 'cross-products', when independent error vectors are multiplied. For multiplication group closure for duals, these cross-products are null objects:

$$[v_O \otimes v_S] \equiv 0[v_O] \quad (50)$$

Figure 28:
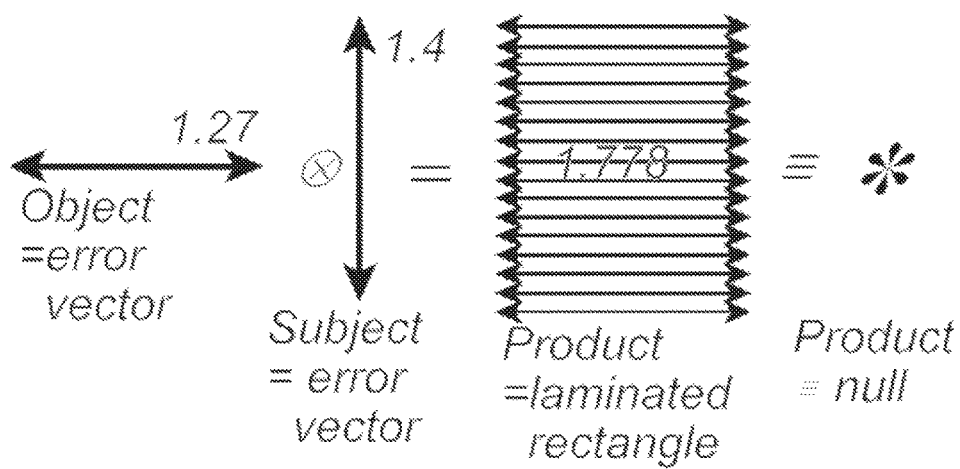
FIG. 28 is a diagram of the geometric multiplication of an error vector object by an error vector subject, in accordance with an embodiment.

For purposes of illustration, FIG. 28 shows that the raw product is a rectangle shaped region laminated by a finite population of object error vector fibers. In actuality, there is a continuous population of object error vector fibers. Since lines widths do not occupy space, the copies actually do not overlap. This rectangle is not a point or an error vector and therefore is not a dual. It is a novel geometry and a multiplication of scalars determines the measure of area for scaling that geometry.

$$1.27[v_O] \otimes 1.4[v_S] = (1.27 \times 1.4)[v_O \otimes v_S] = 1.778[v_O \otimes v_g] = * \quad (51)$$

By necessity of closure for duals multiplication, the laminated rectangle is nullified, as a null object, and does not contribute to the communication of duals.

When four axioms are applied, the geometric multiplication of duals becomes $$\tilde{o} \otimes \tilde{s} = \sigma_p(o \times s)[p] \oplus +1(eo \times s)[v_O] \oplus +1(o \times es)[v_S] \quad (52)$$

Figure 29:
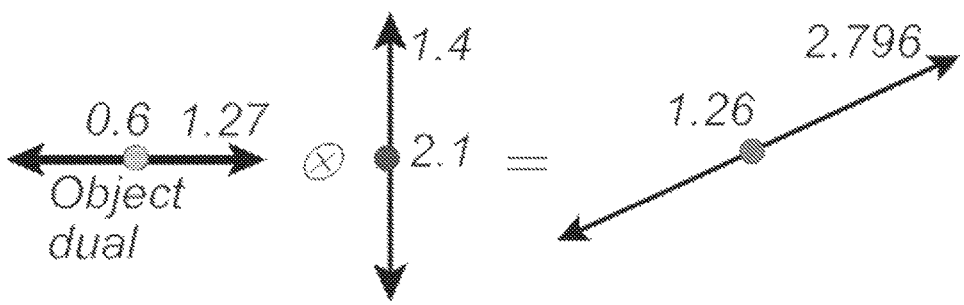
FIG. 29 is a diagram of the geometric multiplication of a dual object by a dual subject, in accordance with an embodiment.

It is seen, therefore, that this product is a dual because it has a defined scaled point and a resultant error vector. FIG. 29 shows an example dual product geometry and the corresponding calculation can be shown algebraically as:

$$(0.6[p] \oplus 1.27[v_O]) \otimes (2.1[p] \oplus 1.4[v_S]) = 1.26[p]$$
$$\oplus 2.667[v_O] \otimes 0.84[v_S] \quad (53)$$

The multiplication of duals is by accumulating the four products of the parts. The result is a dual that has a scaled point and a resultant error vector of two parts. The example shown utilizes the four products of the earlier figures geometry and numbers. This is a geometric addition of three significant parts and one null part. The nullification of the rectangle makes the multiplication of duals commutative as the same geometries are obtained if the object and subject are reversed:

$$\tilde{P} = P[p] \oplus eP[v_p]$$

where $P = \sigma_p(o \times s)$ and $eP[v_p] = (eo \times s)[v_O] \oplus (o \times es)[v_g] \quad (54)$ The product's error vector is a sum of error vectors and this is open to higher dimensions while still retaining the dual format. FIG. 29 uses the calculation of the product error vectors's scalar to be shown later.

4. Special Subject Duals

The duals have a group for addition and a group for multiplication if an identity dual and an inverse dual are determined for each one. These are special subject duals and are particular to the object dual from forward operations. The fourth aspect, therefore, is based on reverse operations but this is not from a simple interpretation. For example, dual reverse addition is not simply dual subtraction. In the same way, dual reverse multiplication is not simply dual division. The structure of this must be established to obtain unambiguous and reusable results.

The forward operation is a binary function when it has an object and subject. This is shown using an operator symbol (addition or multiplication) and any subject $$\tilde{r} = \tilde{o} \circ \tilde{g} \quad (55)$$

The answer to the forward operation is assigned to the result dual. When the result dual is specified and Named, it induces the reverse operation and Naming of specific subject duals (capital letters for named duals):

$$\tilde{o} \circ \tilde{S} = \tilde{R} \quad (56)$$

The answer to the reverse operation is the Named Subject Dual. Table 3, below, is an extension of Table 1 and shows the special duals being considered and is a guide for Naming the operator, subject and result.

TABLE 3

Naming Special Subject Duals

| Name of Subject Dual | Name of Result Dual | Unary Operation Name |
|---|---|---|
| Identity | Object | Identify Plus |
| Conjugator | Conjugate | Identify Minus |

TABLE 3-continued

Naming Special Subject Duals

| Name of Subject Dual | Name of Result Dual | Unary Operation Name |
|---|---|---|
| Flipper | Flipped | Flip |
| Exactor | Point | Nullify Error Vector |
| Vectorize | Error Vector | Nullify Point |
| Nullify | Null | Nullify |
| Inverse | Identity | Invert |

The Named reverse operation starts by stating the forward operation. Example 5 shows that the forward operation leads to the reverse operation and a function for each Named dual's scalar must be constructed in software or hardware to enable calculations.

Dual Example 5

The general forward operation has a dual object on the left, a dual subject on the right and an unspecified operation symbol between them. The answer is assigned to the result:

Forward Operation $\tilde{r} = \tilde{o} \circ \tilde{s}$ $$[r[p] \oplus er[v]] = [o[p] \oplus eo[v]] \circ [s[p] \oplus es[v]] \quad (57)$$

The result is a dual as established in Novel Feature 2. The reverse operation is the determination of the subject dual by finding its scalars. The subject found by the reverse operation is particular to the specified object dual, specified result dual and the chosen operation. It is expected that each of the subject's scalars will depend on the particulars in a function-like way.

Reverse Operation $\tilde{o} \circ \tilde{S} = \tilde{R}$ $$[o[p] \oplus eo[v]] \circ [S[p] | eS[v]] = [R[p] | eR[v]] \quad (58)$$

Capital letters are used to indicate special duals (Named) and their two scalars:

$$\tilde{S} = S(o, eo, \circ, R, eR)[p] \oplus eS(o, eo, \circ, R, eR)[v] \quad (59)$$

With this format shown in Example 5, special duals are generated by making particular choices and this can complete the dual addition group and dual multiplication group with identity duals and inverse duals.

For any operation, these examples are shown below. They are not completely independent and some are fundamentals while others are composites or compounds, built using the fundamentals. Example 6 is a generic structure for forming seven special duals. The kinds of result duals, shown in Table 2, are used to organize cases.

Dual Example 6

The first kind is when the resulting dual is chosen as the object's two indefinite scalars. This will make the subject scalar depend on the object scalars and chosen operator $$\tilde{S} = S(o, eo, \circ)[p] \oplus eS(o, eo, \circ)[v] \quad (60)$$

The three fundamental examples create three special subject duals (in bold) by specifying result duals on the right. The first two are the two instances of the error vector but with an explicit sign:

Identity $[o[p] \oplus eo[v]] \circ [I[p] \oplus eI[v]] = o[p] | + eo[v]$

Conjugator $[o[p] \oplus eo[v]] \circ [C[p] \oplus eC[v]] = o[p] \oplus -eo[v] \quad (61)$ The Flipper subject enables an operation on one scalar to be enacted on the other.

Flipper $[o[p] \oplus eo[v]] \circ [F[p] \oplus eF[v]] = eo[p] \oplus o[v] \quad (62)$ These three fundamental operations can be used to form compound operations.

The second kind of special dual has the result dual chosen with one definite number. The Exactor subject nullifies the object's error vector or chooses its scalar as the number zero $$[o[p] \oplus eo[v]] \circ [E[p] \oplus eE[v]] = o[p] \oplus 0[v] \quad (63)$$

This is also specified as a result dual that has one definite number and one scalar from the object.

$$\tilde{S} = S(o, eo, \circ, 0)[p] \oplus eS(o, eo, \circ, 0)[v] \quad (64)$$

In this example, the Exactor subject is a composite of the Identity and Conjugator subjects, $$\begin{aligned}
\text{Point} &= \frac{1}{2}[\text{Object} \oplus \text{Conjugate}] \\
&= \frac{1}{2}[(\tilde{o} \circ \tilde{I}) \oplus (\tilde{o} \circ \tilde{C})] \\
&= \tilde{o} \circ \frac{1}{2}[\tilde{I} \oplus \tilde{C}] \\
&= \tilde{o} \circ \tilde{E}
\end{aligned} \quad (65)$$

where Exactor $\tilde{E} \equiv \frac{1}{2}[\tilde{I} \oplus \tilde{C}]$

The Exactor is used for compound operations such as Nullify Point such that the result has only the error vector part. This is a special dual subject called Vectorize Vectorize $[o[p] \oplus eo[v]] \circ [V[p] \oplus eV[v]] = 0[p] \oplus eo[v] \quad (66)$ This is a second kind of special dual because one of the specified result scalars is a definite number. It is shown, therefore, that Identity is a composite of Exactor and Vectorize:

$$(\tilde{o} \circ \tilde{E}) \oplus (\tilde{o} \circ \tilde{V}) = \tilde{o}$$

or $\tilde{I} = \tilde{E} \oplus \tilde{V} \quad (67)$

The third kind of special dual is when both of the result scalars are specified as definite numbers. Nullify can also be found by specifying two definite numbers for the result's scalars and this is the third kind of special dual:

$$\tilde{S} = S(o, eo, \circ, 0, 0)[p] \oplus eS(o, eo, \circ, 0, 0)[v] \quad (68)$$

As shown in Novel Feature 2, Nullify is a compound of Exactor and Vectorize but it could also have its own subject, such as Nullify $[o[p] \oplus eo[v]] \circ [N[p] \oplus eN[v]] = 0[p] \oplus 0[v] \quad (69)$ Once the identity has been found, it is specified as a result to find the inverse subject Inverse $[o[p] \oplus eo[v]] \circ [O[p] \oplus eO[v]] = I[p] \oplus eI[v] \quad (70)$ If Identity is specified with two definite scalars, such as [1 0], this is included in the third kind of special dual. If signatures in the Identity are left intact, Inverse is from the first kind of special dual as the subject is solved in terms of the object scalars.

The general operation is applied to dual addition and dual multiplication. The main outcomes are that identity duals and inverse duals can be established to form the groups. The first step is to find a solution for the subject scalars. Selection of the result scalars among the three kinds or particular to the named cases generates the special duals. Example 7 shows the special duals for dual addition.

Dual Example 7—Addition

A set of seven special duals are evaluated first by selecting the operator as dual addition, as shown in FIG. 30. Special subjects may be found to achieve a specified result for a given object. This is from reverse dual addition.

$S=R-o$ $eS=eR-eo$ then $\tilde{S}=(R-o)[p]\oplus(eR-eo)[v]$ (71)

The point scalar does not depend on errors and the error vector's scalar does not depend on the points. These can be solved, one by one, as long as the identity is found before the inverse. The outcomes are for a given object dual defined by its measurement and error scalars, as shown in FIG. 31.

Flipper has a scalar shared by both of its scalars and this is called a co-scalar. The co-scalar is factored to reveal the essential dual. However, with this approach, a co-scalar may be identified for all but the inverse to establish four essential duals $\tilde{p}=+1[p]\oplus 0[v]$ from Vectorize $\tilde{v}=0[p]\oplus+1[v]$ from Conjugator and Exactor $\tilde{w}=+1[p]\oplus-1[v]$ from Identity and Flipper (72)

With distinct scalars, Object and Inverse do not use co-scalars. Over the domain of possible measurements and errors, a co-scalar is used only when measurement and error are the same $o \equiv x$ and $eo \equiv x$ then $\tilde{u}=+1[p]\oplus+1[v]$ from Object and Inverse (73)

This is a geometric addition of the p and v duals. Confirming the dual geometry, among the four essential duals, there are only two independent duals needed to scale and generate special duals. Example 8 shows seven special subject duals for dual multiplication. The special subject duals rely on a common denominator that combines both object scalars with both closure signatures.

Dual Example 8—Multiplication

Special duals are from operations on the same measurement axis with the same error vector direction. The product from the multiplication of an object dual by a subject dual on the same axis is $\tilde{P}=\tilde{o}\otimes\tilde{s}=(\sigma_p(o\times s)+\sigma_v(eo\times es))[p]\oplus(\sigma_p(eo\times s)+\sigma_p(o\times es))[v]$ or $\tilde{P}=P[p]\oplus eP[v]$ where $P=\sigma_p(o\times s)+\sigma_v(eo\times es)$ $eP=\sigma_p(eo\times s)+\sigma_p(o\times es)$ (74)

Special subjects may be found to achieve a specified product for a given object. This is from reverse multiplication. The set of six special duals are evaluated first by selecting the operator as dual multiplication as shown in FIG. 32. The product is chosen and we seek the subject that corresponds to that product dual and object dual. The subject can be solved from reverse multiplication as:

$$\tilde{S}=\frac{1}{D}[(o\times P-\sigma_p\sigma_V eO\times eP)[p]\oplus(o\times eP-eO\times P)[v]] \quad (75)$$

where the Common Denominator is $D\equiv\sigma_p o^2-\sigma_V eO^2$

The point's scalar depends on errors and the error vector's scalar depends on the point's scalars. The closure signatures affect how the product error contributes. Applying this, the set of six special subject duals is obtained. There are two closure signatures available and every answer uses the common denominator, D, as shown in FIG. 33.

Nullify is universal and is the only special subject unaffected by choice of object scalars or signatures. It acts to produce a Null dual for any chosen object. Since Nullify and the Null dual are the same thing, its use terminates any chance of multiplying significant duals. All other special subject duals rely upon object scalars, two signatures and a common denominator.

According to one embodiment, therefore, Feature 4 provides special subject duals for addition and multiplication. The special subjects modify an object using dual arithmetic such that the Named Operations of Feature 2 are accomplished, not by Join and Spilt that step into and out of the duals format, but by staying entirely in the duals format.

5. Rendering

A calculation can have many input duals. The number of independent inputs is counted to be N, such as N=5 for five inputs. This determines the number of error vectors that may be active in every step of a calculation and is the dual dimension, ND. Any final or intermediate answer is a resulting dual, calculated using arithmetic on, at most, all the input duals and this establishes that every dual has at most ND+1 scalars.

Feature 3 established the four fundamental arithmetic operations for duals. The important nugget is that the arithmetic is closed and the result is a dual. Each dual has a resultant error vector that defines its quantitative axis. FIG. 34 shows that the dual has two scalars, one point and one resultant error vector. However, the resultant error vector may be comprised of the N number of independent sources. Since a zero scalar defines a zero contribution, an instance of N scalars defines the construction of any resultant error vector. FIG. 35 shows that a result dual is the geometric summation of N duals as addition occurs on the point and error vector. Since the error vector provides geometric variety, any calculation carries at most N duals stemming from N contributions to its error vector.

Since the dual arithmetic is closed, the result is a dual and it has two defining scalars and one error vector axis shown in FIG. 34. 'Rendering' is the determination of the resulting dual's scalars. The point's scalar is rendered by numerical calculation as shown in FIG. 35. This is accomplished by collecting all scaled point contributions. Since they share the same geometry, the scalars are numerically added.

The error vector's scalar, from FIG. 34, represents its magnitude. With error vectors, the magnitude is bipolar and represents both sides of the error surrounding a measurement point. However, since the resultant error vector is N-dimensional, from FIG. 35, the error vector's scalar is not simply determined by numerical calculation. The novel rendering procedure must flatten the multiple error vector dimensions down to one common geometry. With a common geometry, the scalars can be combined in the same way the point was rendered.

The general object and subject duals for an N-input calculation use the point and every error vector. FIG. 36 shows the construction of the object and subject duals with a scaled point and a geometric summation of N error vector contributions. The multiplication of duals provides a sum of (N+1)*(N+1) products. Application of closure axioms uses (N+1)*(N+1)*(N+1) signatures to obtain a product dual. Most of these signatures are zero. FIG. 37 shows the product dual and its scalar parts. This follows the same format for the ND dual shown in FIG. 34 except now the scalars are composites.

A special subject can be found that flattens the error vectors so they can be measured on a common geometry. This is not the same thing as the Exactor that essentially nullifies error vectors. The Render process obtains zero error vectors but their impact is flattened into the common geometry of the point. FIG. 38 shows the N conditions obtained for the flattening of the product error vector. This is used to solve N subject errors, define a co-scalar and solve for the co-scaled subject dual. FIG. 39 shows the object, special subject named Render and the flattened product. The Render subject is a scaled Conjugate of the object. This induces N+1 'squares' in the scalar of the flat product.

This applies to error vector rendering. An object that is only an error vector has a null point. By selecting the object's point scalar to be numerically zero, the point is nullified and the Render subject and Flat Product are altered and now specific to error vector rendering from FIG. 34. FIG. 40 shows the error vector rendering where both the object and subject are error vector resultants and the product is a scaled point. When the co-scalar is chosen as (−1), the rendering takes on the special form of a self-product. This is shown because the co-scalar appearing in the product originates in the subject alone and the structure is the same regardless of the co-scalar choice. Since the result dual is 1D, it has an single error vector magnitude and is included in the FIG. 40 structure when N=1. FIG. 41 shows the situation when the object dual is a result dual and its error vector is rendered. The equivalence occurs when the result object is from a geometric addition of results from FIG. 35. This yields a new Pythagorean Theorem shown in FIG. 42 that is the entire scalar of the point. This is the special case, found by applying some conditions in sequence from FIG. 39 to FIG. 42, but it represents the underlying calculation method and is widely applicable to error vector rendering.

For a practical calculation, N of the N+1 signatures are freely chosen and one is determined by a condition of a real solution. For example, the signature on the left has allegiance to a real solution, while all signatures on the right are free. If any particular error is solved by specifying the result error, the signature allegiance switches to the unknown error.

Example 9 shows this for a product from the multiplication of an object dual by a distinct subject dual. This is a N=2 case. A self-multiplication of error vectors forces closure on products that share error vectors and eliminates products from distinct error vectors.

Dual Example 9—Product Rendering

The product is defined from multiplication of an object dual by a subject dual. The multiplication is closed and a dual results $$\tilde{P} = P[p] \oplus eP[v_P]$$

where $P \equiv \sigma_p(o \times s)$ and $eP[v_P] \equiv (eo \times s)[v_O] \oplus (o \times es)[v_S]$ (76)

The point's scalar is found directly from the parity and the object and subject point scalars. The error vector's scalar is found using error vector self-multiplication and its closures:

$$(eP \times eP)[v_p \otimes v_p] \equiv (eo \times s)^2 [v_O \otimes v_O] \oplus (o \times es \times es \times s)[v_S$$
$$\otimes v_O] \oplus (eo \times s \times o \times es)[v_O \otimes v_S] \oplus (o \times es)^2 [v_S \oplus v_S]$$ (77)

Applying axioms, this reduces to a common geometry such that scalars can be collected onto the one common geometry to form a single geometric equation. For the self-multiplication of error vectors, the point is the common geometry and each error axis retains its own signature:

$$[v_P \otimes v_P] \equiv \sigma_P[p]$$

$$[v_O \otimes v_O] \equiv \sigma_O[p]$$

$$[v_S \otimes v_S] \equiv \sigma_S[p]$$

Upper case P is used for the product's error vector signature (do not confuse with the lower case p subscript for the parity). With the geometry equation being one scaled geometry, a numerical equation results $$\sigma_p eP^2 [p] \equiv \sigma_O (eo \times s)^2 [p] \oplus \sigma_S (o \times es)^2 [p]$$

$$\sigma_p eP^2 \equiv \sigma_O (eo \times s)^2 + \sigma_S (o \times es)^2$$ (79)

This is New 2D Pythagorean Theorem that includes signatures. These signatures are flexible and can allow inversion of the source and result. For example, if the product and subject are known already, the math can be worked backward to determine the object that participates to result in that product. Since a numerical square root is used, it induces the bipolar sign for the error.

$$eP = \pm \sqrt{eP^2}$$ (80)

Where necessary, the signatures can be determined to maintain solution of real scalar numbers. Assuming a uniform signature among error vectors, a numerical example is:

$$\tilde{P} = P[p] \oplus eP[v_p]$$

where $P \equiv 1.26$ and $eP[v_p] \equiv 2.667[v_O] \otimes 0.84[v_S]$ $(-)eP^2 = (-)2.667^2 = (-)0.84^2$ such that $eP \pm 2.796$ and $\tilde{P} = 1.26[p] \oplus \approx 2.796[v_p]$ (81)

Example 9 showed that the point is a geometry common to all error vector self-products. Another part of rendering is the ability to access every scalar and report it in a numerical display. The Split formatting operation is used for this purpose but requires that a dual be created such that the scalar is accessed from the point or error vector. Since a resultant dual can have error vector being N dimensional, prior to using the Split operation, a selection operation is used.

If the object scalar desired is for the point geometry, the Split operation is already available (see Feature 2). If the desired scalar is for the resultant error vector, the Flatten subject is already available (see above). However, if the desired scalar is for one of the resultant object's error vector contributions, a special subject named Selection has to be defined. FIG. 43 shows the dual Selection subject that combines the null point and signature error vector. The closures for dual multiplication induce null error vector contributions on any object's error vector that does not match the Selection's error vector. The one object error vector contribution that matches the Selection subject error vector induces a self-multiplication and closure to a signature point that retains the object error vector's scalar. Example 10 shows how this works Dual Example 10—Rendering of a Selected Error Vector's Scalar The object is an N-dimensional geometry with N+1 scalars $$\tilde{O} \equiv O[p] \oplus \bigoplus_{n=1}^{N} eO_n[v_n] \quad (82)$$

The Selection subject is for one chosen error vector and has to use its signature $$\tilde{S}_J \equiv 0[p] \oplus \sigma_J[v_J] \quad (83)$$

The dual multiplication of the object by subject induces 2*(N+1) products. At the beginning, N+1 of these are null due to the subject's null point. The remaining N+1 products are from the subject's error vector and the resultant's summation of error vectors are separated into three parts.

$$\tilde{O} \otimes \tilde{S}_J \equiv \sigma_J O[p \otimes v_J] \oplus \bigoplus_{n=1}^{N} \sigma_J eO_n[v_n \otimes v_J] \quad (84)$$

$$\equiv \sigma_J O[p \otimes v_J] \oplus \bigoplus_{n=1}^{J-1} \sigma_J eO_n[v_n \otimes v_J] \oplus$$

$$\sigma_J eO_J[v_y \oplus v_J] \oplus \bigoplus_{n=J+1}^{N} \sigma_J eO_n[v_n \otimes v_J]$$

Applying the closures for dual multiplication nullifies object error vectors that do not match the Selection subject. This is a particular version of the object:

$$\tilde{O}_J = \tilde{O} \otimes \tilde{S}_J = \sigma_J O[v_J] \oplus \sigma_J \sigma_v eO_J[p] \quad (85)$$

The Selection signature is for the chosen error vector and is chosen as non-zero or definite sign. Then this reduces to a dual with the desired scalar on the point:

$$\tilde{O}_J = +eO_J[p] \oplus O\sigma_J[v_J] \quad (86)$$

Finally, the Split formatting operation is used to obtain the scalar number from the point geometry (see Example 1).

6.—Signatures

Multiplication of duals introduces signatures when a point is multiplied by a point or error vector and an error vector is multiplied by a shared error vector. One signature, named Parity is for point multiplications. Every distinct error vector has a signature for self-multiplication and therefore, a calculation with N input duals has N+1 signatures. The signatures represent the transfer of geometric information from duals to numeric information on scalars. The signatures communicate the geometric structure to a level suitable for calculation using numbers. A signature may be of the following format using three possible values.

TABLE 4

Signature Format and Settings

| Format | Minus | Datum | Plus |
|---|---|---|---|
| Symbolic (signs) | − | ∀ | + |
| Numeric | −1 | 0 | +1 |

The symbolic format is rendered in the display by using those text characters. The input of numbers also requires these characters to definitively specify numbers. This replaces the habit and history of inputting or displaying numbers with the + character omitted as a default positive number, such as +2.4 being displayed as 2.4. The duals method elevates the communication by 'what is meant be used.' If 1.29 is a positive number, it is input or displayed with its symbolic signature +1.29. This is strictly needed for error vectors as they are bipolar. Since negative numbers are traditionally input or displayed with the minus sign symbol, it does not save memory or make calculation simpler by omitting the plus sign for positive numbers.

The numeric format places the signature as an active participant in the calculations. The numbers used for scaling the point and error vector parts of a dual are typically from number systems that have both positive and negative numbers due to the use of a scale datum that defines the zero position on the scale. Then the numbers, relative to this datum can be both positive and negative, above and below the datum on the scale. The numeric signature provides a way to switch from one part of the scale to the other side of the datum without changing magnitude. The magnitude, as an un-signed number, is augmented by the signature to represent the full scale's possibilities. This provides a way to investigate separate changes in scalars due to magnitude or sign. This method can be used to generate geometric axioms from fundamental invariance axioms.

The setting of the signature is free or, in the case of dual arithmetic, determined by limitations. This is a trade-off such that to insure the widest possible duals, conditions are placed on the signatures. Example 11 shows the signature limitations needed for Reverse Multiplication as the common denominator may not be zero.

Dual Example 11—Conditions on Signatures from Reverse Multiplication

Reverse multiplication should be valid for wide choices of object scalars. A problem occurs when the co-scalar denominator is zero (D=0) and this is invalid. Validity is achieved by limiting or choosing closure signatures to minimize the risk of zero denominator or D=0 over the widest choices of object scalars. Particular objects create risks and each risk case has a preventative outcome shown in bold Risk Cases for $D = \sigma_p o^2 - \sigma_v eo^2 = 0$ Risk Case 1 $o^2=0$ and $eo^2=0$ then $D=0$ for any $\sigma_p$, $\sigma_v$ Risk Case 2 $o^2=0$ and $eo^2 \neq 0$ then $\sigma_v \neq 0$ Risk Case 3 $eo^2=0$ and $o^2 \neq 0$ then $\sigma_p \neq 0$ Risk Case 4 $eo^2 = o^2$ then $\sigma_p - \sigma_v \neq 0$ or $\sigma_v \neq \sigma_p$ \quad (87)

The Null object is Risk Case 1, it is trivial, D=0 can't be prevented and can't be considered for reverse multiplication. Limitations on the closure signatures can be summarized after accounting for every risk case and there are two possibilities:

$\sigma_p \sigma_v = -1$ $\sigma_p = -1$ and $\sigma_v = -1$ or $\sigma_p = -1$ and $\sigma_v = -1$ \quad (88)

Using these signatures, the denominator for the inverse is resistant to being zero. Only Risk Case 1, the Null dual, cannot be accommodated. Placing the limitation on the error vector's closure signature, the parity signature remains:

$$\tilde{S} = \frac{1}{D}[(o \times P + eO \times eP)[p] \oplus (o \times eP - eO \times P)[v]] \quad (89)$$

where the Common Denominator is $D \equiv \sigma_p(o^2 + eO^2)$

This result applies to all kinds of special duals provided the object is not a null dual. This limit on the error vector's closure signature is important as it propagates into other calculations. It is also universally applicable to all measurement axes. With the risk case limits, the special subject duals are (from Feature 4) as shown in FIG. 44.

As was shown in Example 6 for dual addition, there may be essential duals for multiplication. The first step is to incorporate the full action of the non-zero parity by defining an unsigned common denominator (depending only on object scalars) and having the parity provide the sign $$d \equiv o^2 + eO^2 \quad (90)$$

such that $D \equiv \sigma_p d$ and $\frac{1}{D} = \sigma_p \frac{1}{d}$

The set of special subject duals is changed to the configuration depicted in FIG. 45. The last three special subjects are co-scaled versions of the first three specified result duals. It is shown that Vectorize is not altered by choice of parity signature and is a scaled Flipped. Exactor is a scaled Conjugate and Inverse is either a scaled Object or Conjugate. This limitation on the two closure signatures minimizes the risk of having a zero denominator and insures solutions over a wide range of object choices.

A second approach is to leave parity and error vector signatures indeterminant or dynamic. There is one parity and as many error vectors as there are inputs. They are then determined by local conditions of the calculation. This approach uses the condition of 'real numbers' to force signatures values and insure progress in the calculation. This flexibility provides robustness but also a complication as signatures must be tracked. While this ensures a calculation is successful it may not have a consistent mathematical interpretation as the signatures can be transient, possibly changing between bipolar values as the calculation progresses. Example 11 above minimizes risk by making any error vector signature opposite to the parity. Since there is one parity, all error vector signatures would be the same.

Example 12 shows how signatures can be determined by the conditions required for a square root. In any calculation step, the signatures may be dynamic and respond to the required real solution.

Dual Example 12—Square Root of Dual

The square root of dual is the reverse of the square or self-multiplication of a dual. The quadratic of a dual is the self-multiplication and this occurs on the same axis $$\tilde{q} = \tilde{x}^2 = \tilde{x} \otimes \tilde{x} \quad (91)$$

This is completed to be the following dual on the same axis:

$$\tilde{q} = q[p] \oplus eq[v_x]$$

then $q = \sigma_p x^2 + \sigma_x ex^2$ and $eq = \sigma_p 2xex \quad (92)$

This involves parity and the signature for the one error vector. To reverse this, algebra is performed and the square of the measure is solved using the quadratic formula $$x^2 = \sigma_p \frac{1}{2}\left(q \pm \sqrt{q^2 - \sigma_p \sigma_x eq^2}\right) \quad (93)$$

The error is solved after the measure is solved from a traditional square-root of the above $$\tilde{x} = x[p] \oplus ex[v_x] \quad (94)$$

then $x = \pm \sqrt{x^2}$ and $ex = \sigma_p \frac{1}{2}(eq \div x)$

This solution requires positive quantities within the square roots. Then, depending on the specific quadratic dual, the signatures may be limited to actively insure a real solution. Similar to the risk cases of Example 8, the first condition for validity over any specified quadratic dual is to have opposite signatures and this is the first inequality $$q^2 - \sigma_p \sigma_x eq^2 \geq 0 \quad (95)$$

This creates two scenarios and one places a condition on the signatures:

$q^2 \geq eq^2$ no condition on signatures $$eq^2 \geq q^2 \text{ then } \sigma_p \sigma_x = -1 \quad (96)$$

Then for the most robust choice of quadratic dual, the signatures are opposites. A second condition is from the second square root and this is a second inequality:

$x^2 \geq 0$ or $\sigma_p(q \pm \sqrt{q^2 - \sigma_p \sigma_x eq^2}) \geq 0 \quad (97)$ The parity alone is selected to counteract the possible negative result from the parentheses. Since this condition includes the first square root, this is only necessary if the first condition is met.

$$\sigma_p \sigma_x = -1 \quad (98)$$

$$x^2 = \sigma_p \frac{1}{2}\left(q \pm \sqrt{q^2 + eq^2}\right) \geq 0$$

or $\sigma_p(q \pm \sqrt{q^2 + eq^2}) \geq 0$

This shows that the parity compensates for the choice of sign on the square root. Therefore, there are two cases:

$q + \sqrt{q^2 + eq^2} \geq 0 \quad \sigma_p = -1$ $$q - \sqrt{q^2 + eq^2} \leq 0 \quad \sigma_p = -1 \quad (99)$$

The choice of the sign for the square root is equivalent to the choice of parity. Therefore, in the duals calculation method, the square root of negative numbers (with error) is allowed. For example:

$$\tilde{q} = -4[p] \oplus +3[v_x] \quad (100)$$

then $q = -4$ and $eq = +3$ $$q \pm \sqrt{q^2 + eq^2} = -4 \pm \sqrt{(-4)^2 + (+3)^2} = -4 \pm 5$$

The two cases have the parity responding:

$$\text{Case 1 } x^2 = \frac{1}{2}\sigma_p(q + \sqrt{q^2 + eq^2}) = +\frac{1}{2} \quad \sigma_p \equiv +1 \quad (101)$$

$$\text{Case 2 } x^2 = \frac{1}{2}\sigma_p(q - \sqrt{q^2 + eq^2}) = +\frac{9}{2} \quad \sigma_p \equiv -1$$

which lead to the scalar solutions for the square root of dual:

$$\text{Case 1 } x = \pm \frac{1}{\sqrt{2}} \text{ and } ex = \pm \frac{3}{\sqrt{2}} \quad (102)$$

$$\text{Case 2 } x = \pm \frac{3}{\sqrt{2}} \text{ and } ex = \pm \frac{1}{\sqrt{2}}$$

This example shows the same scalars Flip locations from one solution to the other. Since a division by x is needed, the only problem may be when an exact zero is input. This creates a degenerate condition and its results must be defined. A step toward this is the input of exact quadratics (no error). In that situation, the signature responds to the input quadratic on the following cases:

Case 1 $eq=0$ and $\sigma_p q \geq 0$ then $x=\pm\sigma_p q$ and $ex=0$

Case 2 $e\ q\text{-}0$ and $\sigma_x q \geq 0$ then $ex\text{-}\pm\sqrt{\sigma_x q}$ and $x=0$ \quad (103)

Therefore the duals method allows the square root of exact negative numbers by having compensating signatures and placing answers into error scalars.

Examples 11 and 12, showed signatures compensate either to prevent a zero common denominator or provide real solutions. The duals method is novel as it provides a real solution for the square root of a negative number. The extra information available in the error vector allows these manipulations. The degenerate case of an exact zero input dual is the only risk case that can't be mitigated.

Duals Method for Calculating Uncertainty

The uncertainty calculations utilize two main processes of error analysis: (1) defining error sources; and (2) propagating error.

Feature 1 addresses how duals are defined from measurements or quantization of physicals, according to an embodiment. Inherent to quantization is the finite grid definition with measurements being point instances on the scale and rounding type errors being represented as the error vector part of a dual. Rendering within Feature 5 is another way to establish duals but not with any specific measurement grid.

The propagation of error in the duals method is attained by performing duals arithmetic shown in Features 3 and 4, above, that has fidelity of representation of error vectors. The main power of the duals arithmetic is the closures that keep geometric proliferation in check such that duals arithmetic calculates duals. The implementation of the arithmetic starts with the adoption of addition, subtraction, multiplication and division for duals. Similar to numeric arithmetic, these calculations must be easy to use and accessed by buttons on a calculator, specific computer code or chip hardware.

The first approach is to use arithmetic that is resistant to division-by-zero. This means that parity and error vector signatures are chosen to accommodate the widest choice of scalar numbers. Then they are opposites. Considering the point as an identity geometry, the parity is defined as (+1). To summarize, the parity is positive and negative signatures are used for every independent error vector.

Dual Addition $$\tilde{R} = \tilde{o} \oplus \tilde{s}$$

Answer $\tilde{R} = R[p] \oplus eR[v_R]$ where $R = o - s$ and $eR^2 = eo^2 + es^2$ \quad (104)

Dual Subtraction $$\tilde{R} = \tilde{o} \oplus \tilde{s}$$

Answer $\tilde{R} = R[p] \oplus eR[v_R]$ where $R = o - s$ and $eR^2 = eo^2 + es^2$ \quad (105)

Dual Multiplication $$\tilde{P} = \tilde{o} \oplus \tilde{s}$$

Answer $\tilde{P} = P[p] \oplus eP[v_P]$ where $P = o \times s$ and $eP^2 = (eo \times s)^2 + (o \times es)^2$ \quad (106)

Dual Division $$\tilde{P} = \tilde{o} \oplus \tilde{s} \quad (107)$$

Answer $\tilde{P} = P[p] \oplus eP[v_p]$ where $P = o \times \frac{s}{D}, D \equiv s^2 + es^2$ and $eP^2 = \left(eo \times \frac{s}{D}\right)^2 + \left(o \times \frac{es}{D}\right)^2$ Implementation requires that every step of calculation follow these formula and they become built-in functions embodied in software or hardware.

This arithmetic is the foundation for building higher order functions. Examples of these are common in science, engineering and finance to model a variety of spatial or time-dependent phenomenon: (i) Exponential; (ii) Logarithmic; and (iii) Trigonometric.

These functions have one input and can be fundamentally built upon a series expansion that is the summation of powers.

$$\tilde{y} \equiv f(\tilde{x}) = \sum_{n=0}^{N} \alpha_n \tilde{x}^n \quad (108)$$

Then the implementation of the duals method relies on the power of a dual or a dual raised to an exponent. Since there is one input, the duals arithmetic ensures that the result will still be a dual and utilize the same error vector axis.

$$\tilde{x} = x[p] \oplus ex[v]$$

then $\tilde{x}^n = \Sigma_n[p] \oplus \Delta_n[v]$ \quad (109)

Then an application of the duals arithmetic is Example 13, below. The overall goal is to establish formula and calculation method for the two resulting scalars.

Dual Example 13—Power of a Dual

The power of a dual is a dual raised to an exponent. This is the recursive self-multiplication and occurs on the same error vector axis:

$$\tilde{x}^n = (x[p] \oplus ex[v])^n \quad (110)$$
$$= \tilde{x}^{n-1} \otimes (x[p] \oplus ex[v])$$

Each successive multiplication has two main parts stemming from the two parts of the subject dual.

$$\tilde{x}^n = [\tilde{x}^{n-1} \otimes x[p]] \oplus [\tilde{x}^{n-1} \otimes ex[v]] \quad (111)$$

When the duals are evaluated at every step upward, this power has four parts and closure axioms reduce this to the dual as a scaled point and scaled error vector. Assuming the parity is (+1) provides a simple example. By definition, this starts with the exact one. It is shown, therefore, that the scalars follow terms from the well-known Binomial coefficient:

$$B(n, k) = \frac{n!}{k!(n-k)!} \quad (112)$$

These are distributed into the result's two scalars with odd powers of the error contributing to the result error vector's scalar and the even powers to the result point's scalar. This is confirmed by continuing the powers upward a few more orders (see FIGS. 46 and 47). This is generalized by the two result scalars being odd or even terms of the Binomial coefficient:

$$\sum_n = \sum_{k=0}^{n} S_{k,even} \sigma^{\frac{k}{2}} B(n, k) x^{n-k} ex^k \quad (113)$$

$$\Delta_n = \sum_{k=0}^{n} S_{k,odd} \sigma^{\frac{k-1}{2}} B(n, k) x^{n-k} ex^k$$

The single signature is from the single error vector. The character of the series changes significantly if the signature is changed. It can be expected that this signature is (−1), and is opposite to the assumed (+1) parity. The Switches are composite signatures used to selectively distribute odd and even terms with a binary number system (0:1)

$$S_{k,even} \equiv \frac{1}{2}[(+1)^k + (-1)^k] \quad (114)$$

such that $k \equiv$ even $\quad S_{even} = +1$
and $k \equiv$ odd $\quad S_{even} = 0$ $$S_{k,odd} \equiv \frac{1}{2}[(+1)^k - (-1)^k]$$

such that $k \equiv$ even $\quad S_{odd} = 0$
and $k \equiv$ odd $\quad S_{odd} = +1$ The results for finite powers of duals are two scalars from finite summations. Any series expansion can utilize the results of these summations and combine summations on like powers of the source scalars to perform algebraic simplification prior to embodying the function in software or hardware.

Duals Method for Calculating Uncertainty Using Trans-imaginary Functions

As described above, chordals and duals may effectively and accurately assess error, propagate error and provide uncertainty reporting. However, current efforts to implement duals arithmetic in commercially available computer languages (such as, for example, Excel, MATLAB, Python, mathjs, or LabVIEW) across wide practical applications (such as medical, finance, sports, engineering and science) are hampered by a need to create efficient software code to implement the duals method. The duals method implementation requires a way to convert all numbers, arithmetic steps and functions to the duals arithmetic format. Thus, in accordance with an aspect of the present invention, a computer-based duals method implementation may utilize built-in functions common to many software languages (i.e., those functions already coded by the software developer/retailer) or may utilize computer code configured to adapt commercially available software to perform duals method arithmetic. To avoid fatal errors through software calculations, such as division by zero errors, the implementation may employ "trans-imaginary" numbers and computational algorithms that enable use of the chordals method in support of duals method implementation as will be discussed in greater detail below. In this manner, a software programmer is not required to learn the underlying theory of duals arithmetic before writing code configured to perform the duals method uncertainty calculation.

Figure 48:
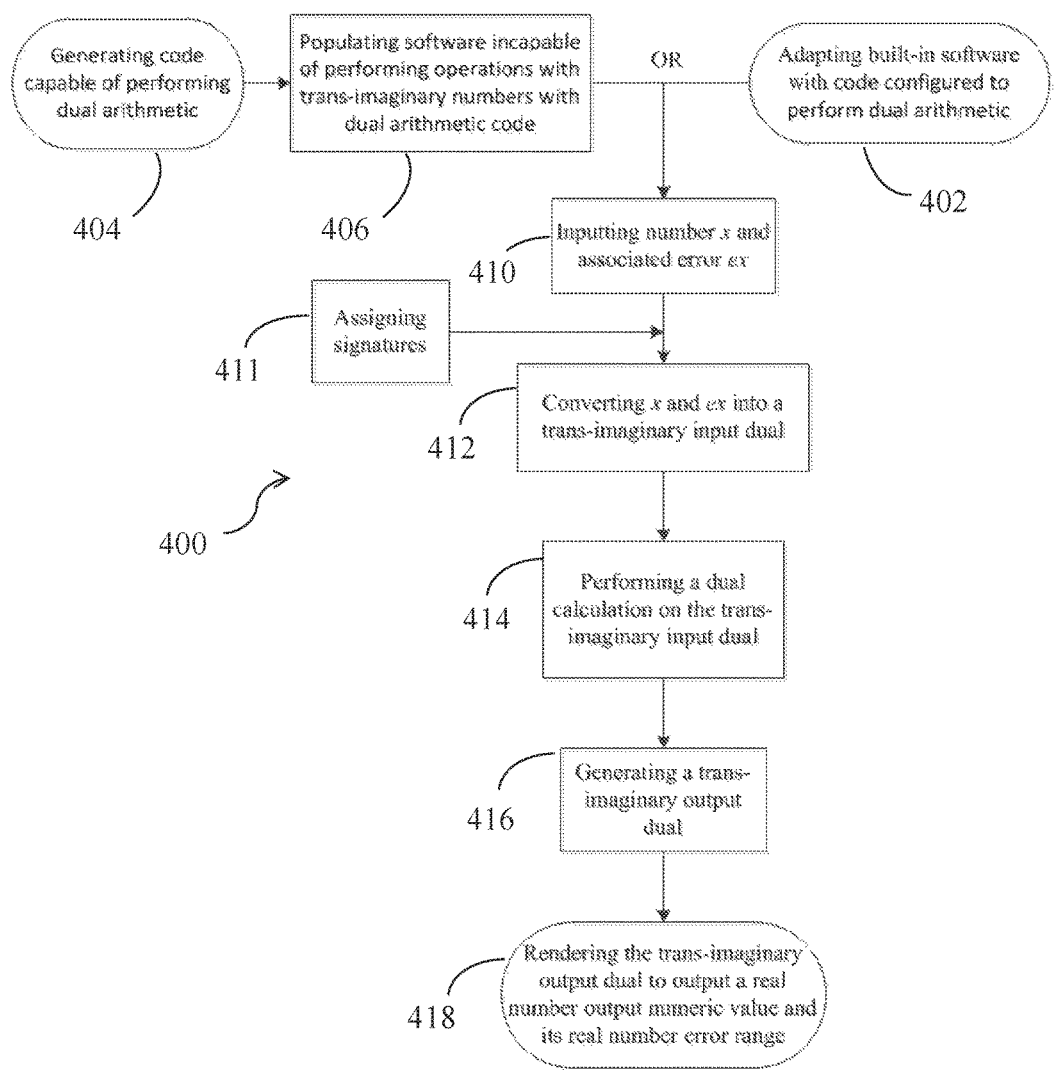
FIG. 48 is an algorithm showing a computerized method for uncertainty calculation in accordance with an embodiment.

With reference to FIG. 48, an exemplary computer-implemented duals method 400 for execution in a computing environment (e.g., computing system 99) may include a first step 410 whereby a user inputs a number, x, and its associated error, ex, such as via user interface 100 as described above. Input processors (such as input processors 103) may then convert x and ex into two instances of chordal data having point and vector components at step 412. In this process, two signatures must be chosen by the user (step 411), indicated generally herein using the Greek letter sigma, namely a parity signature (subscript p) and error vector closure signature (subscript x). While these signatures may be selected to be either (−1, 0 or +1), parity signature $\sigma_p$ is selected to be non-zero. In one aspect of the invention, $\sigma_p$ is selected as (+1). A third signature a, the relative signature (no subscript), is the division of the error vector closure signature ($\sigma_x$) by the non-zero parity signature ($\sigma_p$). The two instances of chordal data may be expressed in the following equations:

$$x_U = \sigma_p(x + \sigma^{+1/2}ex)$$

$$x_L = \sigma_p(x - \sigma^{+1/2}ex)$$

where $\sigma = \sigma_p^{-1}\sigma_x^{+1}$ (115)

In the above equations, x is the number and $x_U$ is the upper limit of the number x in view of error ex, while $x_L$ is the lower limit of the number x in view of error ex.

The robust choice is a relative signature a of (−1) as this obviates the possibility of fatal divide-by-zero and square-root-of-negative computations. For example, a parity signature ($\sigma_p$) of (+1) is accompanied by an opposite error vector closure signature ($\sigma_x$) of (−1). As a result, when the relative signature is chosen to be (−1), the two chordal instances have imaginary parts (i.e. $\sigma^{+1/2}=\sqrt{-1}$). However, $x_U$ and $x_L$ are formatted from two real numbers, the value (x) and the error (ex). Thus, the conversion performed in step 412 is the first part of a process defined herein as a "trans-imaginary function." As will be described in more detail below, these imaginary parts are ultimately reconciled in the second part of the trans-imaginary function to arrive at a calculated value (y) and associated error (ey) comprising only real numbers.

In accordance with one aspect of the invention, memory devices 106 may be prepopulated with commercially available software code configured to perform mathematical operations for preprogrammed functions (step 402). In the case that the relative signature is selected to be (−1) these preprogrammed functions must have the ability to recognize and perform appropriate mathematical operations which include imaginary numbers/functions. Moreover, the commercially available software code may perform computational operations for various mathematical functions through an appropriate power series of the Laurent series and using a finite number of terms (n=[−N to +N]). As described above, duals method 400 generates two chordal instances $x_U$ and $x_L$ such that the commercial software will perform tandem operations:

$$f_U = f(x_U)$$

$$f_L = f(x_L) \quad (116)$$

Thus, in the case that relative signature σ is (−1), the power of a dual will result in duals with composite signatures of the center point and error vector that are real numbers, even though they have trans-imaginary chordal parts ($\sigma^{-1/2}=(1/\sqrt{-1})$) as generally shown below:

$$\tilde{x}^n = \left(\sigma_p^{-1}\frac{1}{2}(x_U^n + x_L^n)\right)[p] \oplus \left(\sigma_p^{-1}\sigma^{-1/2}\frac{1}{2}(x_U^n + x_L^n)\right)[v] \quad (117)$$

It should also be noted that the commercial software may utilize a relative signature σ of (+1) thereby enabling use of Maclaurin series operations which would simplify calculations but be susceptible to division-by-zero errors when performing arithmetic of inverses.

In accordance with a further aspect of the invention, for those computing systems lacking preprogrammed software code capable of performing operations with imaginary functions or that do not use power series computations, software code capable of performing duals method arithmetic with chordals may be generated at step 404. A memory device, such as memory device 106, may then be programmed with the generated code (step 406). In this instance, a computer code application based upon the more general Laurent series calculations may be coded and stored within memory device 106. The Laurent series of a dual representation of each function may be used with truncation to a finite number of terms (n=[−N to +N]) so as to perform duals arithmetic of addition, multiplication and inverse. In accordance with an aspect of the invention, it may be important to meet the robust conditions of the inverse of a dual to guard against divide-by-zero, i.e. a should be selected to be (−1). In such an instance, duals arithmetic insures robustness while other methods do not as current methods fail in the inverse computation needed for the general finite Laurent Series:

$$f_U = \sum_{n=-N}^{+N} a_n x_U^n \quad (118)$$

$$f_L = \sum_{n=-N}^{+N} a_n x_L^n$$

In accordance with an aspect of the present invention, through expanding Equations (113) and (114) above it can be shown that a resulting value y and its error ey are both real numbers. Thus, starting with Equations (113) and (114), the two real scalars may be rewritten to identify common terms:

$$\sum_n = \frac{1}{2}\sum_{k=0}^n [(+1)^k + (-1)^k]\sigma^{k/2}B(n,k)x^{n-k}ex^k \quad (119)$$

$$\Delta_n = \sigma^{-1/2}\frac{1}{2}\sum_{k=0}^n [(+1)^k - (-1)^k]\sigma^{k/2}B(n,k)x^{n-k}ex^k$$

Two parallel scalar components, $X_U$ and $X_L$ may then be extracted wherein $X_U$ and $X_L$ are expressed as chordals:

$$X_U \equiv \sum_{k=0}^n (+1)^k \sigma^{\frac{k}{2}} B(n,k)x^{n-k}ex^k \equiv \sum_{k=0}^n B(n,k)x^{n-k}(+1\sigma^{1/2}ex)^k = \quad (120)$$

$$(x+\sigma^{1/2}ex)^n$$

$$X_L \equiv \sum_{k=0}^n (-1)^k \sigma^{\frac{k}{2}} B(n,k)x^{n-k}ex^k =$$

$$\sum_{k=0}^n B(n,k)x^{n-k}(-1\sigma^{1/2}ex)^k = (x+\sigma^{1/2}ex)^n$$

Simplifying, $X_U$ and $X_L$ may be expressed as:

$$X_U = x_U^n \text{ where } x_U \equiv x + \sigma^{1/2}ex$$

$$X_L = x_L^n \text{ where } x_L \equiv x - \sigma^{1/2}ex \quad (121)$$

Thus, the point and vector components within Equation (109) may be uncoupled whereby the sum (E) and difference (A) may be separately calculated as:

$$\sum_n = \frac{1}{2}(X_U + X_L) \quad (122)$$

$$\Delta_n = \sigma^{-1/2}\frac{1}{2}(X_U - X_L)$$

Substitution yields Equation (117):

$$\tilde{x}^n = \left(\sigma_p^{-1} \frac{1}{2}(x_U^n + x_L^n)\right)[p] \oplus \left(\sigma_p^{-1} \sigma^{-1/2} \frac{1}{2}(x_U^n + x_L^n)\right)[v]$$

Whether commercial software included built in functions amendable to duals arithmetic or whether software code was written and stored within memory 106, a processor (e.g., processor 117) may then perform the user-defined function (step 414) to generate a trans-imaginary output dual (step 416) generally in the form of Equation (117). The processor may then render the built-in functions or series expansion software code to display results in dual output format (i.e. through interface output 119) at step 418. In this manner, the dual format consists of two real numbers yet the computation may be completed using complex, trans-imaginary and/or real numbers. The imaginary parts of the chordal results are converted with combinations of the parity and relative signatures such that the resulting value, y, and its error, ey, are both real numbers in accordance with the equations:

$$y = \sigma_p^{-1} \frac{1}{2}(f_U + f_L) \qquad (123)$$

$$ey = \sigma_p^{-1} \sigma^{-1/2} \frac{1}{2}(f_U - f_L)$$

That is, when σ is selected to be (−1), summation of will $X_U$ and $X_L$ will result in the subtraction of the imaginary portions of the chordals, thereby yielding resulting value y as a real number. Similarly, taking the difference of $X_U$ and $X_L$ will result in the subtraction of the real portions of the chordals, thereby yielding an imaginary number which is reconciled by multiplication with $\sigma^{-1/2}$ to yield a real number for resulting error ey. The rendering performed by the computing system in step 418 is the second part of the trans-imaginary function. That is, real numbers are initially converted to include imaginary parts (step 412) which are then rendered (step 418) to yield real number results. Accordingly, the imaginary portions of the chordals operate as transitory elements and are thus referred herein as, trans-imaginary functions.

With reference to FIGS. 49 and 50, exemplary computer codes with examples of rendering with a parity signature assumed to be (+1) by default are shown. These examples are not meant to limit the present application solely thereto and any suitable computer code may be developed as needed or desired and such code is not limited solely to one or more software platforms but may be modified as necessary to accommodate the specific coding/language of any suitable computer software program. Turning now to the figures, FIG. 49 shows an exemplary function 500 where the relative signature has been selected to be (−1). FIG. 50 shows an example of a natural logarithm function 600 including trans-imaginary format where the relative signature can be selected to be either (−1) and (+1). As can be seen in FIGS. 49 and 50, these codes are very short (less than 15-20 lines) with easy implementation in commercially available software code, in these examples, MATLAB, although any software code may be similarly modified/written in accordance with the present invention. It should be noted that the portions of the code prefixed with % are comments and are not part of the executable code.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

A "module" or "component" as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computing system for calculating uncertainty without a fatal division-by-zero error or a square-root-of-an-imaginary-number error, the computing system comprising:
    a memory including computer executable instructions stored therein that are configured to calculate a number result and an associated resultant error;
    a user interface device configured for inputting a numeric value and an error value associated with said numeric value;
    a processor in communication with said memory and said user interface device, wherein said processor utilizes said computer executable instructions to perform the steps:
        a) converting said numeric value and said error value into a trans-imaginary input dual, wherein said trans-imaginary input dual is a hybrid of numeric and geometric information having a real number input component representing said numeric value and a complex number input component representing said error value;
        b) performing a dual calculation operation using said trans-imaginary input dual to generate a trans-imaginary output dual having a real number output component representing said number result and a complex number output component representing said resultant error; and
        c) rendering said trans-imaginary output dual, wherein said real number output component generates said number result as a real number and said complex number output component generates said associated resultant error as a real number error range, wherein steps a)-c) avoid the fatal division-by-zero error or the square-root-of-an-imaginary-number error through first converting said numeric value and said error value to said trans-imaginary input dual and then rendering said output dual to generate said number result and said associated resultant error.

2. The system of claim 1, wherein said numeric value is a measurement, and said error value is an error range or uncertainty associated with said measurement.

3. The system of claim 1, further comprising a non-transitory storage medium configured to store said numeric value, said error value, and/or said trans-imaginary input dual.

4. The system of claim 1, wherein said user interface device is further configured to output said real number output component.

5. The system of claim 1, wherein said user interface device is a biosensor.

6. The system of claim 1, wherein said computer executable instructions are configured to receive the numeric value.

7. The system of claim 1, wherein said computer executable instructions are configured for formatting said trans-imaginary input dual, wherein said formatting is dependent at least in part upon a calculation to be performed using said formatted trans-imaginary input dual.

8. The system of claim 1, wherein said computer executable instructions comprises software code configured to convert said numeric value and said error value into said trans-imaginary input dual, perform said dual calculation, and generate said real number and said real number error range.

9. The system of claim 8, wherein said software code is a pre-existing software code adapted to perform said dual calculation.

10. The system of claim 8, wherein the software code is a new software code generated to perform said dual calculation.

11. A method programmed for execution in a computing environment for calculating uncertainty without a fatal division-by-zero error or a fatal square-root-of-an-imaginary-number error, wherein a computing system is provided and comprises a memory having computer executable instructions stored therein that are configured for calculating a number result and an associated resultant error, a user interface device for inputting a numeric value and an error value associated with said numeric value, and a processor in communication with said memory and said user interface device, the method comprising the steps of:
    converting, using said processor, said numeric value and said error value into a trans-imaginary input dual, wherein said trans-imaginary input dual is a hybrid of numeric and geometric information having a real number input component representing said numeric value and a complex number input component representing said error value;
    performing, using said processor, a dual calculation operation using said trans-imaginary input dual to generate a trans-imaginary output dual having a real number output component representing said number result and a complex number output component representing said resultant error; and
    rendering, using said processor, said trans-imaginary output dual wherein said real number output component generates said number result as a real and said complex number output component generates said associated resultant error as a real number error range, wherein the converting, performing and rendering steps avoid the fatal division-by-zero error or the square-root-of-an-imaginary-number error through first converting said numeric value and said error value to said trans-imaginary input dual and then rendering said output dual to generate said number result and said associated resultant error.

12. The method of claim 11, wherein said numeric value is a measurement, and said error value is an error range or uncertainty associated with said measurement.

13. The method of claim 12, further comprising the step of taking said measurement.

14. The method of claim 11, further comprising the step of storing said numeric value, said error value, and/or said trans-imaginary input dual in a non-transitory storage medium.

15. The method of claim 11, further comprising the step of outputting, using said user interface device, said real number output numeric value.

16. The method of claim 11, wherein said user interface module is a bioactuator.

17. The method of claim 11, further comprising the step of communicating said real number output numeric value via a wired or wireless network.

18. The method of claim 11, further comprising the step of formatting, using said processor, said trans-imaginary input dual, wherein said format is dependent at least in part upon a calculation to be performed using said formatted trans-imaginary input dual.

19. The method of claim 11, further comprising the step of populating said processor with a software code configured to convert said numeric value and said error value into said trans-imaginary input dual, perform said dual calculation, and generate said real number and said real number error range.

20. The method of claim 19, wherein said software code is a pre-existing software code adapted to perform said dual calculation.

21. The method of claim 19, wherein said software code is a new software code generated to perform said dual calculation.

* * * * *